(12) United States Patent
Koch et al.

(10) Patent No.: US 11,816,396 B2
(45) Date of Patent: Nov. 14, 2023

(54) CONSTRAINT BASED AUTOMATIC TERRAIN SURFACE DESIGN

(71) Applicant: Autodesk, Inc., San Francisco, CA (US)

(72) Inventors: Valentin R. Koch, Kelowna (CA); Patrick A. Bergeron, Anjou (CA); Nicholas James Zeeben, Bedford, NH (US); Qing Xue, Shanghai (CN); Weiwei Hu, Shanghai (CN)

(73) Assignee: AUTODESK, INC., San Francisco, CA (US)

(*) Notice: Subject to any disclaimer, the term of this patent is extended or adjusted under 35 U.S.C. 154(b) by 91 days.

(21) Appl. No.: 17/096,421

(22) Filed: Nov. 12, 2020

(65) Prior Publication Data
US 2021/0141966 A1 May 13, 2021

Related U.S. Application Data

(60) Provisional application No. 62/934,817, filed on Nov. 13, 2019.

(51) Int. Cl.
| | |
|---|---|
| *G06G 7/48* | (2006.01) |
| *G06F 30/13* | (2020.01) |
| *G06F 30/12* | (2020.01) |
| *G06T 17/20* | (2006.01) |
| *G06F 111/04* | (2020.01) |

(52) U.S. Cl.
CPC ............. *G06F 30/13* (2020.01); *G06F 30/12* (2020.01); *G06T 17/20* (2013.01); *G06F 2111/04* (2020.01)

(58) Field of Classification Search
CPC ...... G06F 2111/04; G06F 30/12; G06F 30/13; G06T 17/05; G06T 17/20; G06T 19/20; G06T 2219/2021
See application file for complete search history.

(56) References Cited

U.S. PATENT DOCUMENTS

| | | | | |
|---|---|---|---|---|
| 5,886,702 | A * | 3/1999 | Migdal | G06T 17/20 345/423 |
| 2006/0206623 | A1* | 9/2006 | Gipps | G06Q 10/06 709/238 |
| 2008/0183434 | A1* | 7/2008 | Putnam | G06T 15/80 703/1 |
| 2013/0013265 | A1* | 1/2013 | Narayan | G06T 17/05 703/1 |

(Continued)

OTHER PUBLICATIONS

Chappell, Eric. Autodesk Roadway Design for InfraWorks 360 Essentials. John Wiley & Sons, 2015.*

(Continued)

*Primary Examiner* — Rehana Perveen
*Assistant Examiner* — Nithya J. Moll
(74) *Attorney, Agent, or Firm* — Gates & Cooper LLP

(57) ABSTRACT

A method and system provide the ability to design a terrain surface. A triangular surface mesh representative of an existing surface is obtained. One or more constraints to control the triangular surface mesh are specified. Drainage for the triangular surface mesh is automatically determined based on the constraints. The triangular surface mesh is optimized based on the drainage and one or more design options. The optimizing modifies the triangular surface mesh to define drainage flow for the drainage.

20 Claims, 17 Drawing Sheets

(56) References Cited

U.S. PATENT DOCUMENTS

2018/0075169 A1\* 3/2018 Koch ................ A01B 79/005

OTHER PUBLICATIONS

Nobre, Antonio Donato, et al. "Height Above the Nearest Drainage—a hydrologically relevant new terrain model." Journal of Hydrology 404.1-2 (2011): 13-29.\*
Bauschke, H.H., et al., "On Projection Algorithms for Solving Convex Feasibility Problems", SIAM Review, Sep. 1996, pp. 367-426, vol. 38, No. 3.
Chew, L.P., "Guaranteed-Quality Mesh Generation for Curved Surfaces", Proceedings of the Ninth Annual Symposium on Computational Geometry, 1993, pp. 273-280.
Chew, L.P., "Constrained Delaunay Triangulations", Algorithmica, 1989, pp. 97-108, vol. 4.

\* cited by examiner

CONSTRAINT BASED AUTOMATIC TERRAIN SURFACE DESIGN

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/934,817, filed on Nov. 13, 2019, with inventor(s) Valentin Koch, Patrick Allen Bergeron, Nicholas James Zeeben, Qing Xue, and Weiwei Hu, entitled "Constraint Based Automatic Terrain Surface Design".

This application is related to the following and commonly-assigned patent application, which application is incorporated by reference herein:

U.S. patent application Ser. No. 15/705,083, filed on Sep. 14, 2017, which issued Feb. 8, 2021 as U.S. Pat. No. 10,915,670 by Valentin R. Koch and Hung M. Phan, entitled "Spatial Constraint Based Triangular Mesh Operations in Three Dimensions,", which application claims the benefit under 35 USC 119(e) of Provisional Application Ser. No. 62/394,608, filed on Sep. 14, 2016, with inventor(s) Hung M. Phan and Valentin R. Koch, entitled "Applying Geometric Constraints on Triangles in Three Dimensions".

BACKGROUND OF THE INVENTION

1. Field of the Invention

The present invention relates generally to road design, and in particular, to a method, apparatus, system, and article of manufacture for an automated workflow for creating terrain surfaces.

2. Description of the Related Art (Note: This application references a number of different publications as indicated throughout the specification by reference names and publication year enclosed in brackets, e.g., [Doe 2018]. A list of these different publications ordered according to these reference numbers can be found below in the section entitled "References." Each of these publications is incorporated by reference herein.)

The workflow of creating and maintaining terrain surfaces (also referred to as a named finished ground) during site design or road highway design is currently a very manual process. For example, in site design when "building a pad terrain surface", dozens of feature lines first need to be created manually. Hundreds of elevation points then need to be created in those feature lines. Complex grading (terrain surface) settings (like grading criteria, grading group and grading styles) need to be created as well. The users must then create a building pad (terrain surface) from the feature lines and apply grading settings. All of these operations are manual. The disadvantage is that any requirement or design change incurs work that becomes more complex and time intensive. Usually, the elevation values of those elevation points need to be updated manually for a minor requirement change. So, a much more simple, practical way is needed to improve the workflow efficiency. To better understand these problems, a description of prior art terrain surface construction may be useful.

The terrain surface construction process of the prior art is usually solved by pencil and paper and manual design combined with an engineering design and documentation/building information model (BIM) software application (e.g., the CIVIL 3D application provided by the assignee of the present application). The engineers get the existing condition of a terrain surface (field survey) first. The engineers then do substantial work laying out the parking, sidewalks, utilities, and everything around the buildings in a site. Every engineer project manager performs this process a little bit differently. However, in general, the engineer project managers examine where the connection points are, where driveways have to meet with some roads or some neighboring lots, using pencil and paper. They draw these connection points out (roughly where things need to go), try to guess at what a finished floor might need to be and what constraints are going to control any of the grading. The project is then handed off to other technicians who go into the details of the feature lines and try to match their vision of what they came up with on pencil and paper. However, as described above, such a process is a manual process primarily utilizing pencil and paper.

FIG. 1 illustrates the terrain design workflow of the prior art. As illustrated, data (e.g., DWG files, landxml files, etc.) is imported to the design application (e.g., CIVIL 3D) at step 102. The terrain is then manually designed at step 104 including designing a parking lot 106, designing a building pad 108, designing a sidewalk 110, designing a grading 112, and designing utilities 114. The manual design process repeats until the designer is satisfied with the result at step 116 after which the design process is complete at step 118.

Alternative prior art solutions (e.g., the SITEOPS application from BENTLEY) has similar weaknesses to that described above. For example, too many parameters and operations are needed to manually fit the drainage requirement when designing a parking lot or building pad. In addition, the SITEOPS application is not interactive, uses a very different algorithm (i.e., a Genetic Algorithm) that does not react well to changes, and detailed two-dimensional (2D) geometries need to be laid out first.

In view of the above, what is needed is the capability to automate and interactively design a terrain surface in an efficient manner.

SUMMARY OF THE INVENTION

The software workflows supported by modern civil engineering applications require a lot of user intervention and manual work when creating, refining, and maintaining terrain surfaces. Embodiments of the invention optimize and automate the workflow for creating a terrain surface (or named finished ground) during site design or road highway design. The time cost saved can be from days to minutes compared to the traditional workflow.

In addition to the work efficiency improvement, embodiments of the invention can help users speed up terrain surface preliminary design work by providing multiple design options. The output of the traditional prior art workflow is limited to one single option for the terrain surface. Users typically already have design ideas when performing conceptual work. For example, some low points in the terrain could be placed at different locations, based on how designers do their grading (terrain surface). Also, different objectives (nice contours, small volumes, balanced volumes, earthwork cost) may be weighted differently. Embodiments of the invention can provide multiple options of/for optimized terrain surface designs quickly because it automates the terrain surface creation process. The users/civil engineers and their clients can then discuss and agree on one optimal option and use it as the basis/base for a detail design. Further to the above, embodiments of the invention may determine drainage automatically/autonomously (e.g., using drain lines and low points to make sure drainage meets user requirements).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
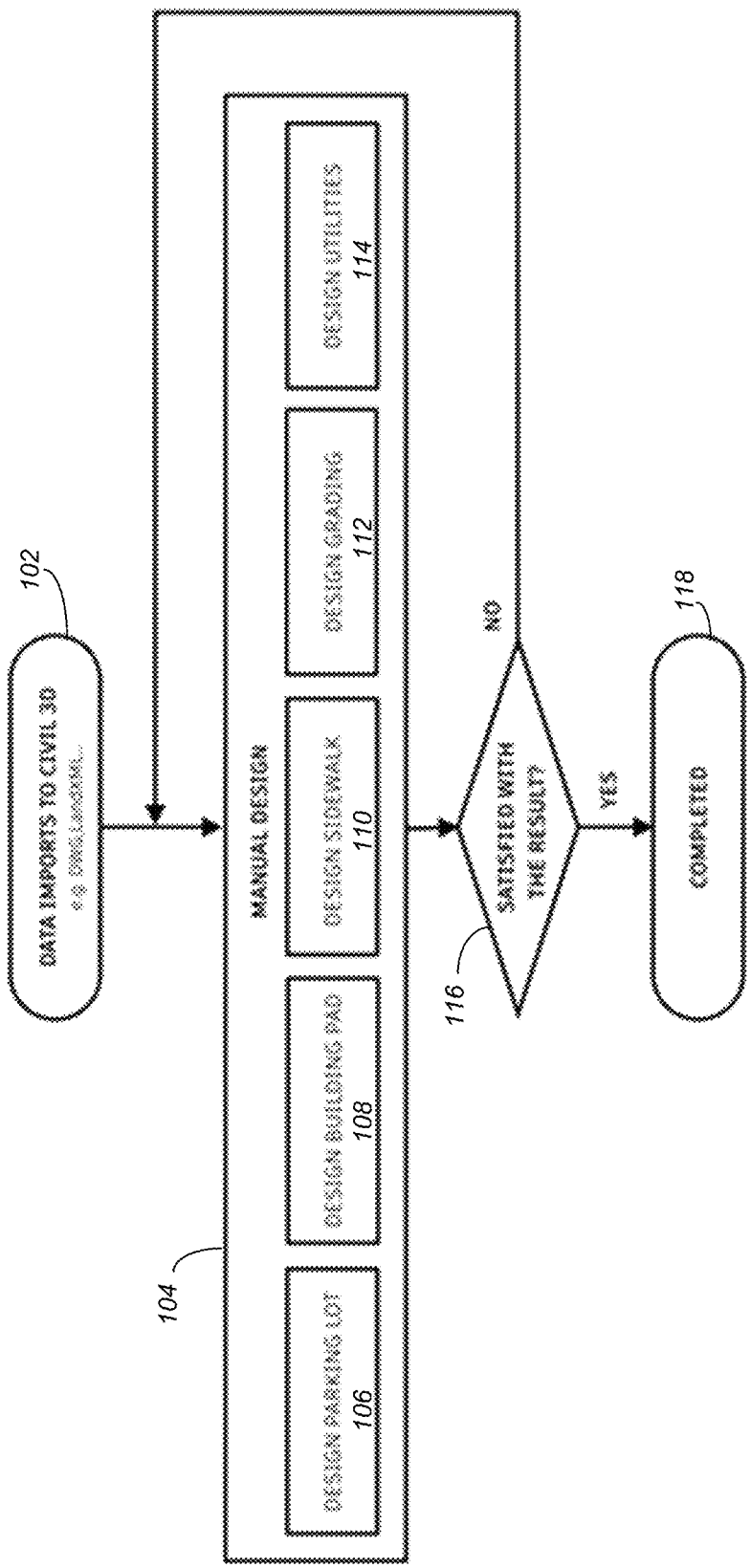
FIG. 1 illustrates the terrain design workflow of the prior art.
Figure 2:
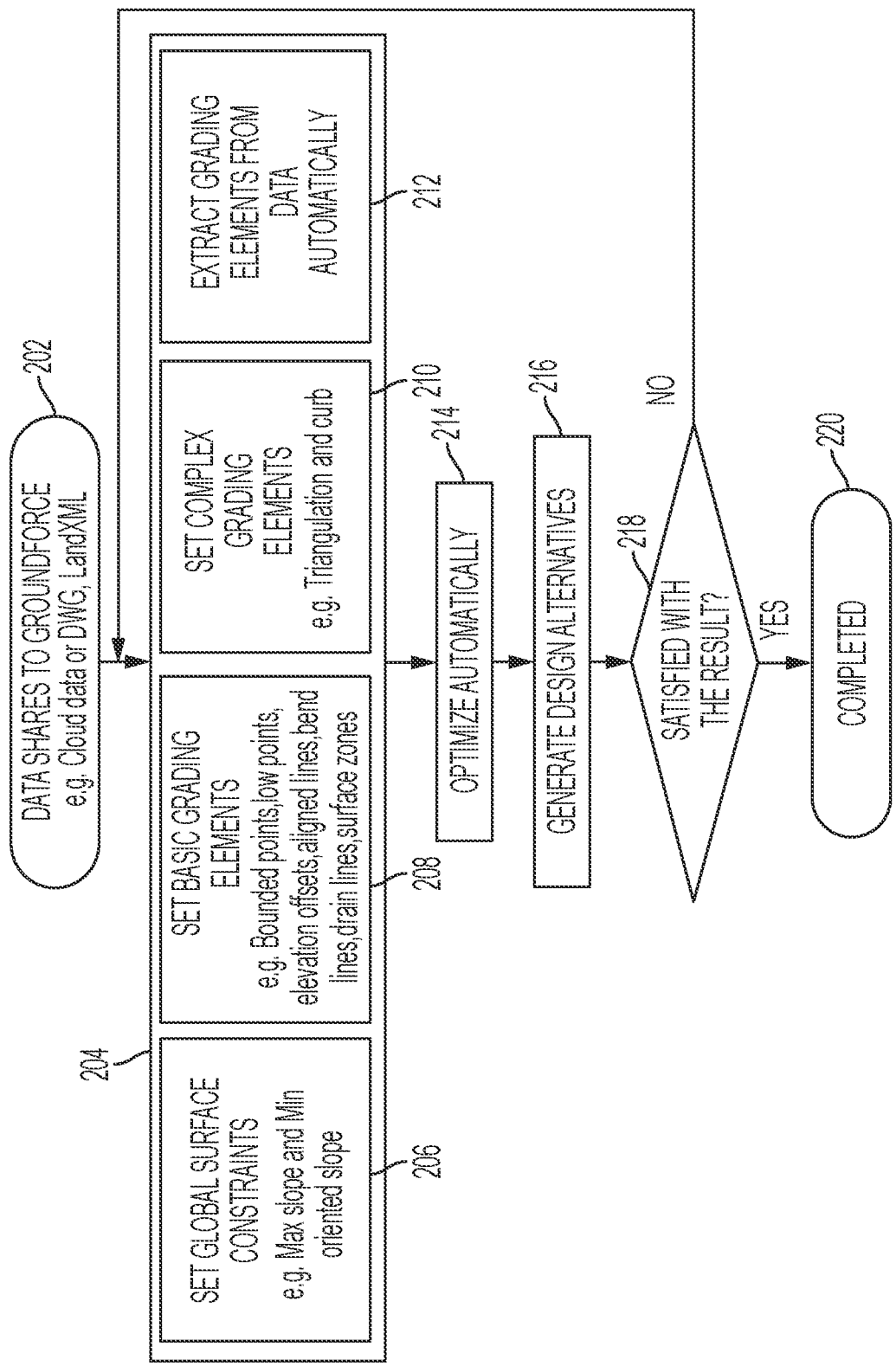
FIG. 2 illustrates the logical flow for a grading optimization workflow in accordance with one or more embodiments of the invention.

FIG. 2 illustrates the logical flow for a grading optimization workflow in accordance with one or more embodiments of the invention. Embodiments of the invention provide a system that allows the import of a computer-generated surface from a file or from a computer cloud framework at step 202 (e.g., cloud data or DWG, LandXML, etc. is shared to a software application such as the GROUNDFORCE application available from the assignee of the present application). The system provides tools and interfaces 204 that allow a user to set design constraints and design objectives 206 (e.g., global surface constraints such as max slope and min oriented slope) with the help of basic surface grading elements 208 (e.g., bounded points, low points, elevation offsets, aligned lines, bend lines, drain lines, surface zones, etc.) on the imported computer generated surface. The methods/interfaces 204 may also include setting complex grading elements 210 (e.g., triangulation and curb elements) or extracting gradient elements from data automatically 212.

Thereafter, the system may automatically/autonomously optimize at step 214 by running optimization methods to change the imported surface in order to generate a grading solution at step 216 (i.e., generating design alternatives) for the given constraints and objectives. The system allows the user to analyze solutions and change design constraint settings and design objective settings in order to change them and rerun the optimization to obtain more solutions. The user can then save the solutions as a new surface in a file or in the cloud. The system allows the user to create the grading elements 208-210 directly via tools, or extracts the grading elements automatically 212 from existing data in files or in a computer cloud. The extraction 212 may make use of design geometry defined in the data. The extraction may create grading elements from design geometry through a mapping that maps labels or names to a grading element. The system provides a set of basic grading elements 208 that can be combined into a complex grading element 210. A complex grading element 210 may be a composition of basic grading elements 208 and may contain methods to set up the basic grading elements 208 as well as methods to change the triangulation of the surface for the complex grading element 210. Once the user is satisfied with the results at step 218, the process is complete at step 220.

Further to the above, with embodiments of the invention, users can have the software return optimal elevations and slopes for their grading design instead of having to provide the specific slopes or elevations directly with traditional CAD (computer-aided design) tools. In addition, instead of creating objects at specific elevations or slopes, embodiments of the invention may provide the allowed ranges for these values using the constraints. The software will return the result that best meets these constraints and objectives. This way the user can also realize much sooner if a grading design will not meet all the constraints—instead of having to manually create different grading elements and then iterating through trying different elevation and slope values until they either get a result that works, or realize the design will not work.

Workflow

The process of creating and maintaining a terrain surface is provided by embodiments of the invention. Technically, a terrain surface can be triangulated. Related U.S. patent application Ser. No. 15/705,083 (which is incorporated by reference herein) provides a numeric methodology that can enforce spatial constraints on individual triangles and their vertex elevations, as well as a combination of triangles and their vertex elevations. For example, elevations may be constrained such that the normal vectors of triangles stay in a specified range. These are controlled by user input for these constraints. A terrain surface can then be created automatically (i.e., based on the constraints). Based on the numeric methodology, embodiments of the invention provide a new terrain surface optimization workflow.

Figure 3:
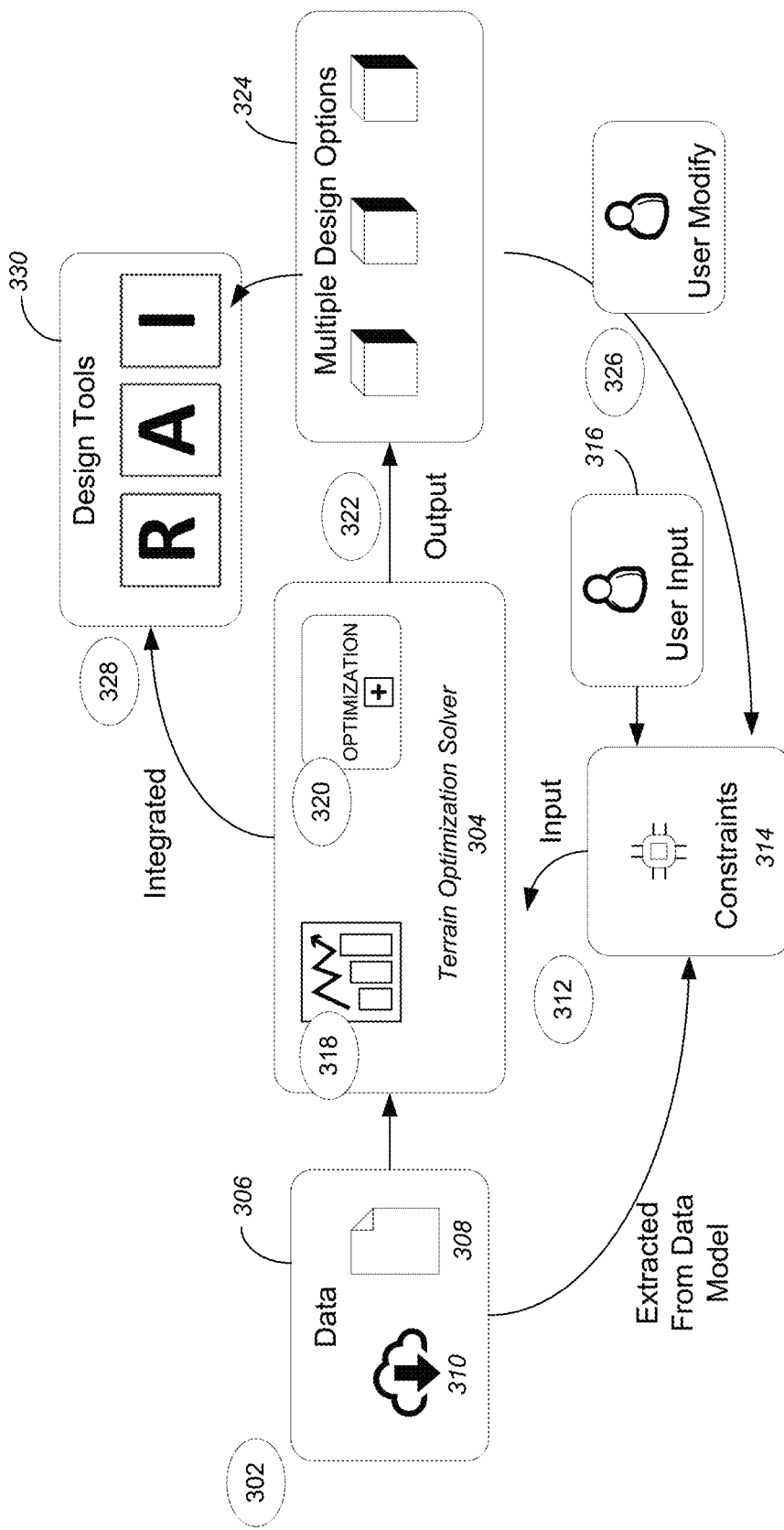
FIG. 3 illustrates the terrain optimization workflow in accordance with one or more embodiments of the invention.

FIG. 3 illustrates a different view of the terrain optimization workflow in accordance with one or more embodiments of the invention.

At step 302, the existing condition of the terrain surface to be optimized is added (i.e., to the terrain optimization solver 304). The data source 306 can both be file based 308 and from the cloud 310. In this regard, a triangular surface mesh (representative of an existing surface) is obtained. Such a mesh includes two or more triangles connected by vertices and edges.

At step 312, constraints 314 to control the terrain surface triangles are specified. The constraints 314 either can be input (e.g., accepted via user input 316) or extracted from a design model (i.e., from the data source 306) (e.g., the constraints may be autonomously extracted from a design model/data source 306). For example, the user may have a "building pad terrain surface" in dwg file format (designed in CIVIL3D) (e.g., a file 308 within data source 306) as an existing condition. Once the design model is added in the terrain optimization solver 304, all the constraints 314 like a minimum/maximum grading slope in a direction (e.g., that is based on a location of a drain line or low point), low points, grading slope values, earthwork volumes, etc. in the original data can be input/extracted into the optimization solver 304. The user can also modify, edit or delete the constraints 314. Furthermore, the user can specify more constraints 314 (e.g., via user input 316) like a drain line and more low points. Extracting constraints from an existing model then utilizing them in the optimization solver 304 provides advantages and novelty over the prior art. Further, as described herein, the constraints may be defined via grading elements that provide an element for laying out a design to be graded. In this regard, properties for each grading element may be configured (e.g., via user input or via extraction from an existing model). The grading elements may be defined in a different data source (i.e., than that of the application executing the optimization solver) in a different format. In such an implementation, embodiments of the invention may connect to the different data source and map the grading elements from the different data source to grading elements in a native format of a current application (e.g., the application executing the optimization solver).

At step 318, a design application (within the terrain optimization solver 304) automatically/autonomously (e.g., without additional user input) determines drainage. Drain lines and low points are used to tell terrain triangles where they should incline themselves. Users can add drain lines (easier operation than drawing lines in a CAD application) in any area and specify the low points. The optimization solver 304 can autonomously modify the mesh such that drainage flows alongside the drain lines into the low points. In other words, step 318 automatically determines drainage for the mesh based on the constraints.

At step 320, optimization is started which triggers a terrain surface creation methodology/algorithm automatically/autonomously. In step 320, the terrain surface is updating, and the updates are visualized and can be animated during the update process (for instance, using drain animation to simulate drainage design optimization result). The output at step 322 provides multiple optimization design options 324 (the multiple options can be provided simultaneously/at the same time for selection by a user). Just like the multiple design options in a generative design application, the user can choose which design 324 meets the requirements (for example, an option for a smooth grading change, an option to balance the cut and fill, an option to minimize earthwork volumes, and/or an option to minimize earthwork cost). Thus, step 320 includes optimizing the mesh based on the drainage and one or more design options (where the optimizing modifies the mesh to define drainage flow for the drainage in accordance with one or more selected design options).

At step 326 the optimized terrain is reviewed with clients in a terrain generation application (e.g., within terrain optimization solver 304) on-site and some constraints 314 may be adjusted. Thereafter, terrain optimization 320 may be rerun per the clients' feedback. The whole workflow is improved (over the prior art) significantly in this step. In the traditional (prior art) workflow, hundreds of parameters like points elevation values need to be updated manually, and the new generated model based on the new parameters may not be reliable. For instance, when a user does the grading routine, the whole site model can go corrupt. In contrast, the workflow of FIG. 3 improves the stability and reliability of the system. Only several constraints 314 need to be modified and multiple new design options 324 will be generated automatically/autonomously.

At step 328, the optimization solver 304 can either be used independently or integrated into a different software application (where various design tools 330 may be utilized) such as CIVIL3D, INFRAWORKS and REVIT. Once integrated, users who are using the different software application (e.g., CIVIL3D) can continue with the detail design based on the optimization result transparently just like the optimization solver 304 is a function of CIVIL3D. In other words, the design may be based on the mesh, the optimization method/algorithm may be encapsulated into an optimization solver application that in turn is integrated into a different application such that the optimization solver operates transparently like it is a function of the different application, and the design output from the optimization solver may be further edited in the different application.

In view of the above, one may note that any combination of the following constraints 304 and objective functions may be used as input to the optimization solver 304:

Constraints:
Maximum Slope of a triangle surface;
Minimum Oriented Slope of a triangle surface (for required drainage);
Drain Lines (which help determine the orientation of the Minimum Slope);
Low Points (which also help determine the orientation of triangles);
Bounded Points;
Aligned Lines (which aligns vertices on a TIN surface on a line);
Aligned Surfaces (which also aligns vertices on a TIN surface in an area);
Elevation Offsets between two vertices;
Objective Functions:
Grade change minimization between pairs of adjacent triangles;
Earthwork Cut and Fill Volume minimization; and
Earthwork Cut and Fill balancing.

Workflow Details

Based on the workflows described above, the solver may return optimal elevations and slopes for a grading design instead of having to provide specific slopes or elevations directly with traditional CAD tools (and/or pen and paper). Instead of creating objects at specific elevations or slopes, users can provide the allowed ranges for these values using the constraints. The solver will return the result that best meets these constraints and objectives. The description below provides an exemplary implementation for optimizing a surface in civil engineering.

Use of Design Constraints to Optimize a Surface in Civil Engineering

With the proposed system, users can build predefined and complex grading elements that match real world grading behaviors. For example, pavement zones can be built with default minimum and maximum slopes and a default depth of physical materials that would not be included in earthwork quantities. This could be suited to match the design intention for pavement in a parking lot. One could also have building pad zones that are required to be flat but also represent the depth of concrete and base materials.

More complex elements could represent curbing along the edge of a parking area or parking island. This could represent the steep elevation difference along the curbs. Drainage ponds could also be represented with a combination of zones in order to model a level berm around the outer edge and required slopes inside the pond.

Surface Representation in Computer Assisted Design

Figure 4:
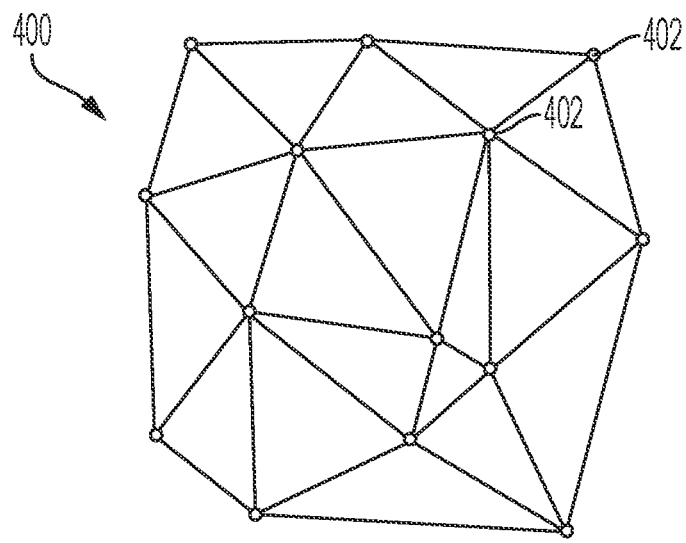
FIG. 4 illustrates a typical TIN utilized in accordance with one or more embodiments of the invention.

In the system, a surface may be represented by triangular meshes. More particularly, the system may use a triangulated irregular network (a.k.a., TIN) to represent the terrain surface. FIG. 4 illustrates a typical TIN utilized in accordance with one or more embodiments of the invention. The TIN 400 includes two or more triangles connected by vertices 402 and edges. The TIN 400 is an excellent choice to represent terrain surface, because of its ability to combine good element shapes with odd domain shapes and triangle sizes that grade from very small to very large areas.

The TIN 400 in the system may be represented in three-dimensions. The X and Y coordinate of every TIN vertex 402 can represent a real geolocation on the globe, the value of X and Y depends on the coordinate system which is used by the model in the system. There is also a Z value for every TIN vertex 402. The Z value represents the terrain altitude in that vertex. The system ignores the Z value when triangulating the TIN 400. It just makes the triangles in the TIN 400 as equilateral and equiangular as possible in two-dimensions to avoid some numeric issues in the solver. Later, the optimization solver will find the best Z values for every TIN vertex 402 according to the design constraints, which is called the solution.

The system can work with a grid model as well, such as the digital elevation model (a.k.a., DEM), because the grid cell can be into two triangles easily by connecting the cell diagonal. Once a grid cell is split, there is no difference between a grid model and TIN for embodiments of the invention.

Existing Method to Solve Design Constraints on a TIN

The optimization methods to solve the constraints or minimize the objectives that the user or the system sets (as described herein), may include the method described in U.S. patent application Ser. No. 15/705,083.

Use Grading Elements to Set Surface Constraints

General Workflow

Embodiments of the invention allow properties of grading elements (described further below) such as a minimum and maximum slope, depth of the grading elements, etc. to be translated into optimization constraints (i.e., 206 and 208 of FIG. 2 and step 312 of FIG. 3).

Figure 5:
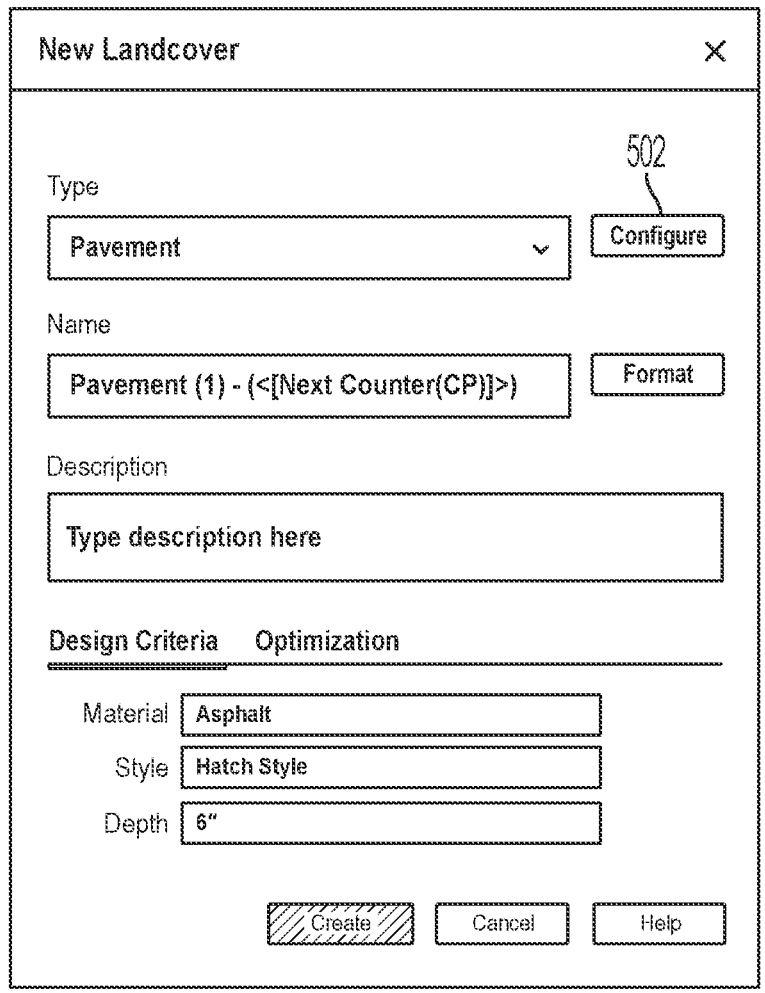
FIG. 5 illustrates an exemplary dialog window used to create grading elements in a CAD application in accordance with one or more embodiments of the invention.
Figures 6, 8:
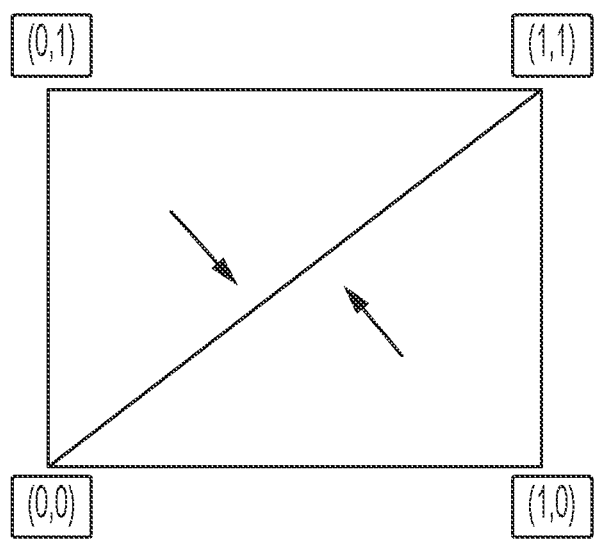
FIG. 6 illustrates an exemplary dialog window with pavement as the type of the grading element and the ability to configure the pavement's properties in accordance with one or more embodiments of the invention.
FIG. 8 illustrates a triangular surface with two triangles, where each triangle has a minimum required slope constraint in the direction represented by the arrows in accordance with one or more embodiments of the invention.

An overview of the workflow is described below:

In a design tool (e.g., design tools 330 of FIG. 3) that can be separate from the proposed system or that may be part of/integrated into the system, a user can define grading elements (e.g., pavement, parking, sidewalk, building pad, etc. . . . ) to layout a civil engineering or architectural design that may require grading. FIG. 5 illustrates an exemplary dialog window used to create grading elements in a CAD application in accordance with one or more embodiments of the invention. Specifically, the user has opted to create a new landcover grading element and has further selected that the element is a pavement type. By clicking on a configure button 502, a user may be able to reach a configuration dialog and set grading element properties, which will later be translated into surface constraints for grading optimization in the system. FIG. 6 illustrates an exemplary dialog window with pavement as the type of the grading element and the ability to configure the pavement's properties in accordance with one or more embodiments of the invention. As illustrated, the user may edit the pavement properties including the material, depth, style, zone type, min slope, and max slope.

Figure 7:
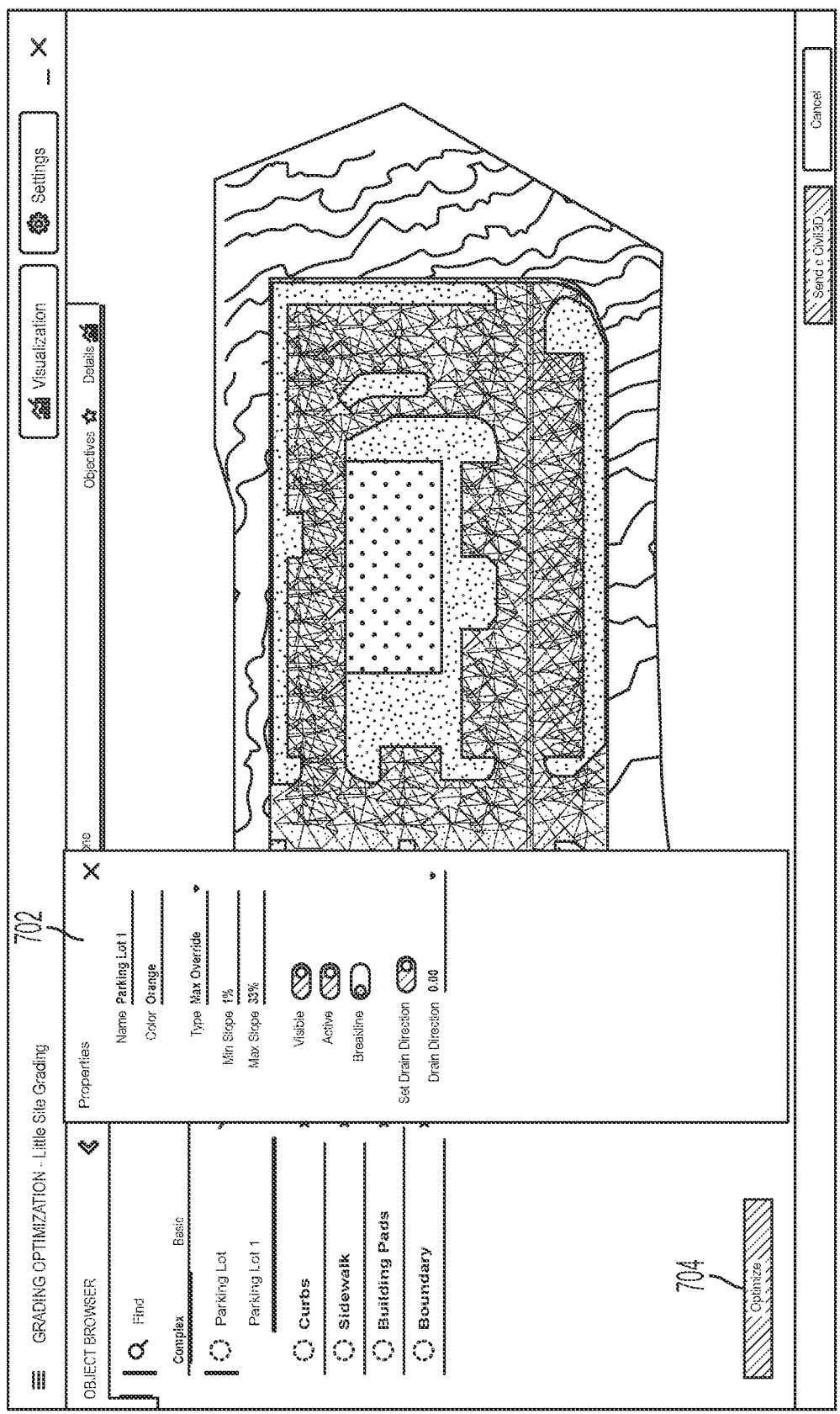
FIG. 7 shows the interface that a user can view and use to modify the grading elements and constraints in a system object browser in accordance with one or more embodiments of the invention.

All the grading elements defined in the design tool with their constraints may be shared with the system. Users may be able to modify the grading elements in the design tool (e.g., as illustrated in FIG. 6), or in the system as well. FIG. 7 shows the interface that a user can view and use to modify the grading elements and constraints in a system object browser in accordance with one or more embodiments of the invention. As illustrated in FIG. 7, the grading element is a parking/parking lot grading element and the properties tab 702 is expanded to allow for editing of the properties including the name, color, type, min slope, max slope, visibility, etc. These properties may then be used as constraints during a terrain optimization process (e.g., that may be performed by selecting the Optimize button 704).

Multiple Grading Elements and Priorities

There are generally more than one grading element in a model. In most cases, they have the same priorities because they don't intersect with each other. However, there is one exception: the surface zone (see below for description of surface zones).

A surface zone is defined by a simple 2D polygon. A set of grading constraints will be applied on all the triangles inside the polygon. Apparently, one triangle can belong to more than one surface zone if the surface zones overlap with each other. However, the grading constraints of different surface zones can conflict with others, as a result, every surface zone should have its own unique priority to resolve the conflicts. If more than one surface zone covers a triangle, the zone with the highest priority wins.

With the priority, embodiments of the invention can create a surface zone which is more than a simple polygon that interacts with other surface zones. For example, a ring-shape surface zone can be created by two surface zones: surface zone X with a smaller simple polygon with higher priority, and surface zone Y with a larger simple polygon, which contains the polygon X completely, with lower priority. Now, all the triangles inside X are taken by X, the rest of the triangles inside Y form a ring shape surface zone.

Global Surface Constraints

The system lets the user define global surface constraints that should be applied over the entire surface. Global constraints settings are set on all triangles, and the system may then override or relax these global constraint settings, depending on other grading elements. The system may therefore treat the global constraint settings with the least priority.

Maximum Slope

The user may set a maximum slope constraint on the surface or the grading limit. This means that triangles or cells are not to exceed the given maximum slope, with respect to gravity (z-axis). In this regard, the maximum slope field contains the maximum allowed slope value in percentage, for any triangle on the graded surface. The initial value may be set to infinity, which allows triangle slope to be near vertical. As described above, this constraint is applied globally, unless it is overridden when a triangle lies in some types of surface zones (e.g., aligned surface, drain override surface, or max override surface). Also, if the triangle does not lie in a zone and a flag for Grade Zones Only is checked, the maximum slope for that triangle is infinity (triangle max slope is relaxed).

Minimum Drainage/Oriented Slope

The user may require a minimum drainage/oriented slope constraint on the surface or the grading limit. This means that triangles or cells need to have a minimum required slope in a given direction (orientation). That direction may be determined by/based on other grading elements such as drain lines or low points. The method for how the directions can be determined by these elements is described further below. FIG. 8 illustrates a triangular surface with two triangles, where each triangle has a minimum required slope constraint in the direction represented by the arrows. As illustrated, the arrows 1102 are pointing in the direction of the closest drain line 1104 or 1106 or the low point of such drain lines 1104/1106. Further, or in addition, the constraint may consist of a slope range in the direction (and/or within a direction range).

Additional Constraints

Additional constraints that the user may configure include a maximum number of iterations that the algorithm will run. If the algorithm finds a solution that is within a tolerance parameter, it may stop before reaching the maximum number of iterations. In this regard, the user may have the option of setting a tolerance value. For example, if the user enters a maximum slope of 5%, this translates to a maximum slope decimal value of 0.05. If the tolerance is set to 0.005, it means that the algorithm will stop when all the triangles are within 0.005 of the maximum slope of 0.05. Hence, in this example, if a triangle has a slope of 0.0549 (0.49% steeper than 5%), it is considered to be within tolerance. If all constraints are within tolerance, the algorithm will stop. In some cases, a user would like the algorithm to keep smoothing the terrain until the maximum iterations are reached. In this case, the tolerance may be set to zero.

An optional constraint/element that may be defined is a grade zones only flag. If such a flag is checked, the algorithm will only try to solve for the triangles that are inside surface zones (i.e., triangles in outside zones will be left untouched).

Basic Grading Elements

Basic Grading Elements are components that set a constraint (such as the ones described in U.S. patent application Ser. No. 15/705,073) on a surface point, a group of surface points, a surface triangle, or a group of surface triangles. The following listed Basic Grading Elements may be used as distinct grading elements, or may just be an attribute or property of a more general grading element. For example, a Bounded Point may be represented in the method as such, or as a general point that has the bounded property. Similarly, an Aligned Line may be represented as a distinct grading element, or it could be a general polyline with the aligned property. The same applies to Surface Zones.

Bounded Points

Figure 9:
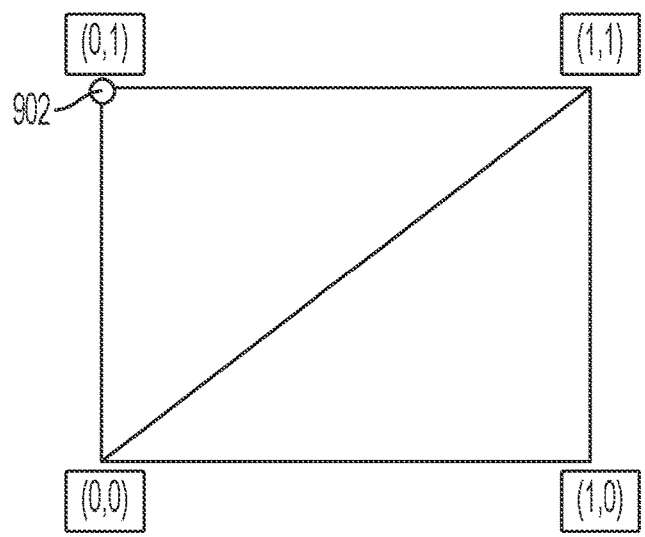
FIG. 9 illustrates a bounded point grading element in accordance with one or more embodiments of the invention.

A Bounded Point is a point on the surface that the user can place or the method can place automatically, that has the bounded property, which will put bounds on the elevation of the surface at that point. The user may set a lower bound for the surface at that point, as well as an upper bound. If the lower bound and the upper bound coincide, the surface elevation at the point is fixed. FIG. 9 illustrates a bounded point grading element in accordance with one or more embodiments of the invention. In FIG. 9, the bounded points are at vertex (0,1) in the upper left corner of the triangular surface (as indicated by the circle 902).

Low Points

A Low Point grading element is a point on the surface that the user can place or the method can place automatically, to determine the direction in which triangles on the surface should incline themselves at a minimum required slope. In order to determine the drainage direction for the minimum required slope of a triangle, the method measures the shortest distance between the triangle and each low point. The method may also measure the shortest distance between the triangle and each of the drain lines, if there are any. Drain lines and low points are collectively referred to as drain elements. The method then selects the drain element that has the smallest of the shortest distance and uses the direction of the line that represents that shortest distance from the triangle to the drain element as the direction for the minimum oriented slope constraint for that triangle.

Elevation Offsets

An Elevation Offset is defined by two points on the surface, that are a horizontal distance greater than zero apart, and where one point is considered the high point, and the other point is considered the low point in the elevation offset. The user may then set an upper bound and a lower bound on the offset. The offset upper bound is the maximum vertical distance or maximum elevation difference that the two points should have, where the low point should be lower or equal in elevation to the high point. The offset lower bound is the minimum vertical distance or minimum elevation difference that the two points need to be apart, where the high point needs to be at least that minimum vertical distance higher than the low point.

Aligned Lines

An Aligned Line element is a polyline on the surface that the user can place or the method can place automatically, that has the aligned property. The Aligned Line may require triangle vertices on the surface, which touch the line or are at a close distance to the line, to align themselves vertically. Aligning vertically in this context may mean that if the points are sorted in order as they touch the line when going from one endpoint to the other, and the Euclidean distance between consecutive points is shown on a plot using the horizontal axis, and the corresponding elevations are shown on the same plot using the vertical axis, then connecting the points in the plot should form a straight line.

Bend Lines

A Bend Line element is a polyline on the surface that the user can place or the method can place automatically, that has a bend property along the line. The Bend Line may relax some or all constraints on triangles and points that touch that line or are in a close distance to the line. Furthermore, the bend line may exclude triangles that touch the line or are in a close distance to the line from the minimization or maximization of some objectives during the optimization.

Drain Lines

A Drain Line grading element is a polyline on the surface that the user can place, or the method can place automatically, to determine the direction in which triangles on the surface should incline (or decline) themselves at a minimum required slope. In order to determine the drainage direction for the minimum required slope of a triangle, the method measures the shortest distance between the triangle and each drain line. The method may also measure the shortest distance between the triangle and each of the low points explained above, if there are any. The method then selects the drain element that has the smallest of the shortest distance and uses the direction of the line that represents that shortest distance from the triangle to the drain element as the direction for the minimum oriented slope constraint for that triangle.

Figure 10:
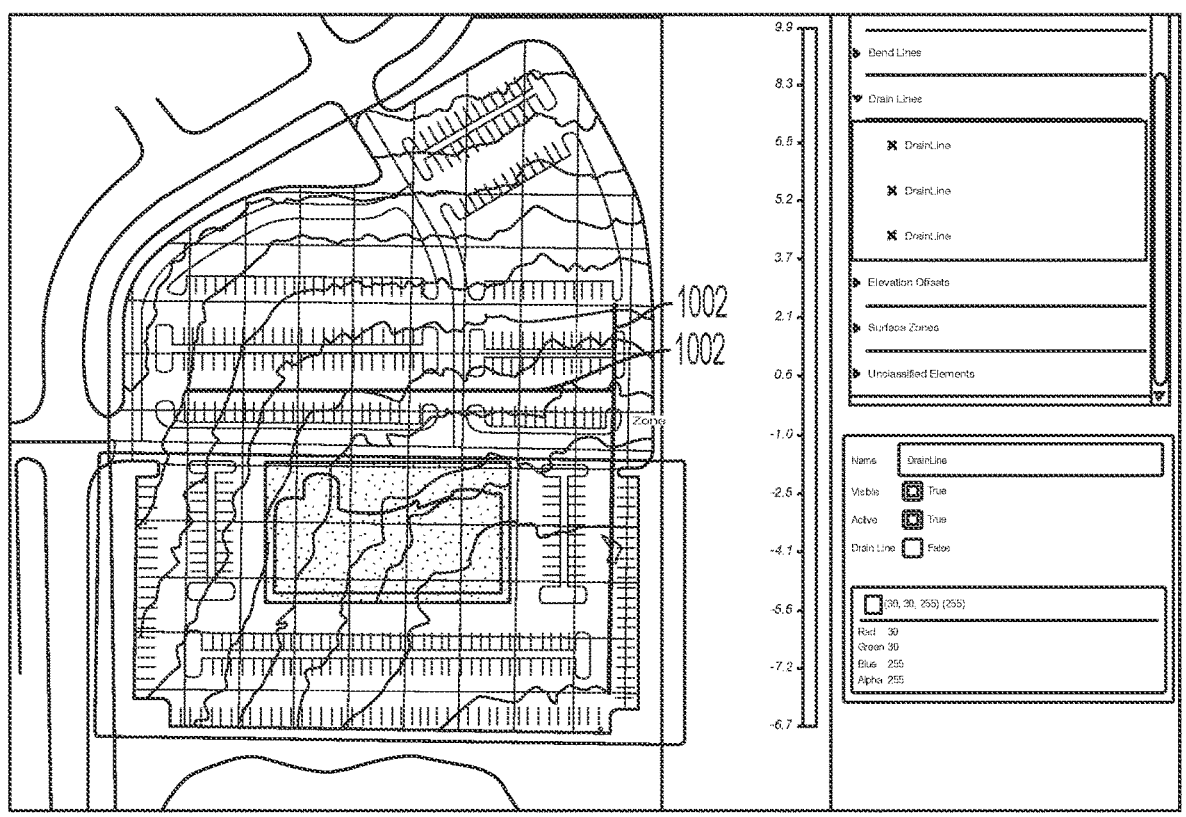
FIG. 10 illustrates an exemplary placement of drain lines in accordance with one or more embodiments of the invention.
Figure 11:
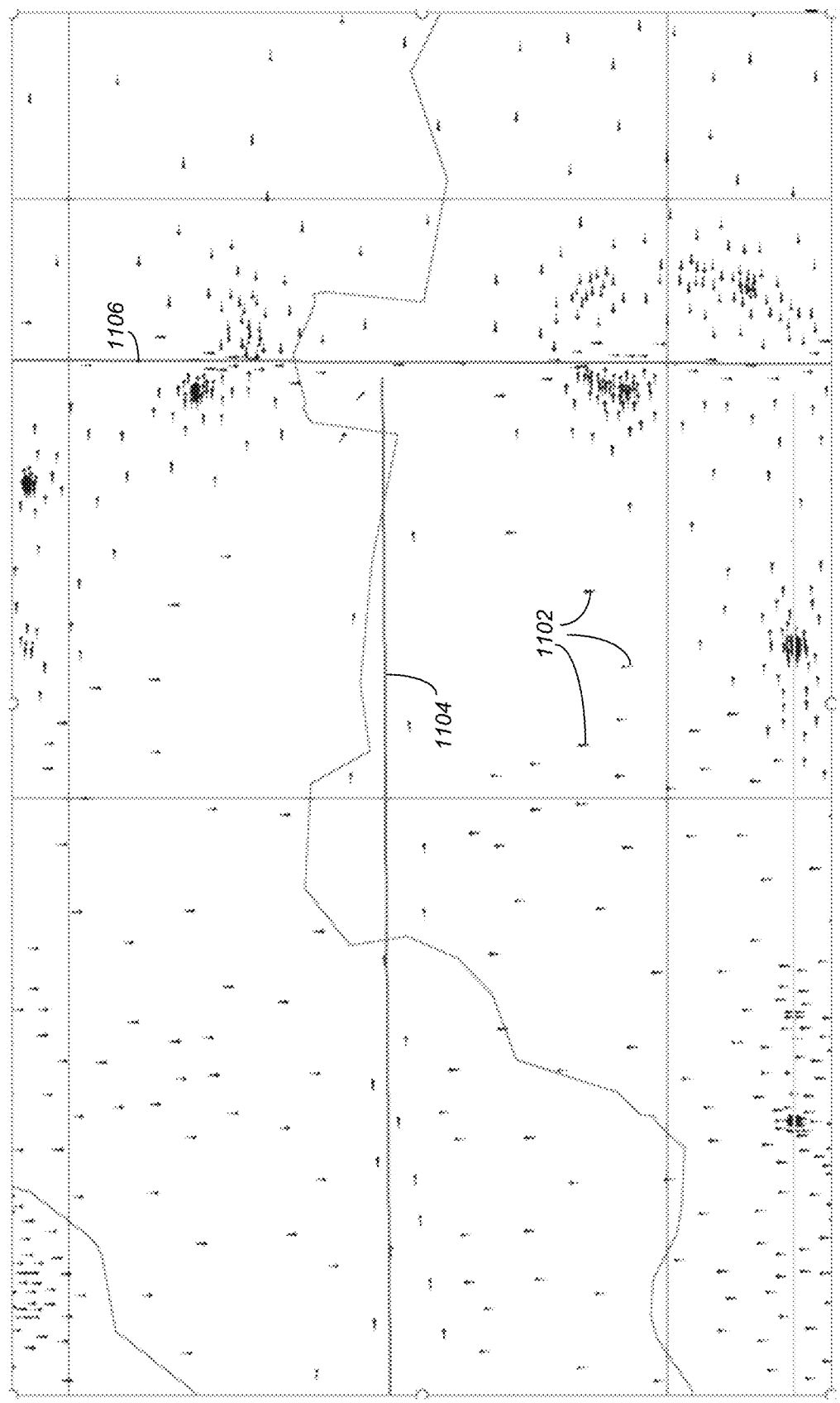
FIG. 11 illustrates a zoomed in view showing direction vectors in accordance with one or more embodiments of the invention.

As an example, suppose a surface slope drains in a first direction and there is a desire to maintain this patter but create some drainage channels that let the water flow around a building. Drain lines can be placed to initiate such a design. FIG. 10 illustrates an exemplary placement of drain lines 1002 in accordance with one or more embodiments of the invention. When placing drain lines 1002, the first point is the high point and the second point is the low point. After placing drain lines, each triangle will orient itself to the closest drain line or the closest low point. To visualize the drainage directions of the triangles, one can select a drain flow visualization option "Direction vectors". Thereafter, by zooming in on a surface direction vectors may be displayed that indicate the desired triangle inclination. FIG. 11 illustrates a zoomed in view showing direction vectors 1102 in accordance with one or more embodiments of the invention.

Surface Zones

A Surface Zone can be a set of triangles in a TIN, or a set of rectangles or cells in a grid surface, that may or may not be adjacent to each other. The zone can be defined by selecting triangles or grid cells individually, or by creating a polygon that defines the extend of a zone. To create a zone, a polygon may be drawn by the user or may be imported from data (e.g., by left clicking on a surface when in an edit mode to place a first point of a polygon, with subsequent left clicks placing subsequent polygon points, and a right click to close the polygon). The method detects if a triangle or a grid cell lays inside the polygon. The method may use the centroid or triangle vertices of a triangle to detect if it is inside a polygon. If a triangle is inside the polygon, the system will assign it to the zone. The system lets the user select a zone type or set zone properties that define a type, that may set design constraints or design objectives on the triangles in the zone. The system may offer the following properties for surface zones: Maximum slope and minimum slope, independent drainage, aligned, exclusion, no minimization, and/or grading limit zone.

Maximum Slope and Minimum Slope

Figure 12:
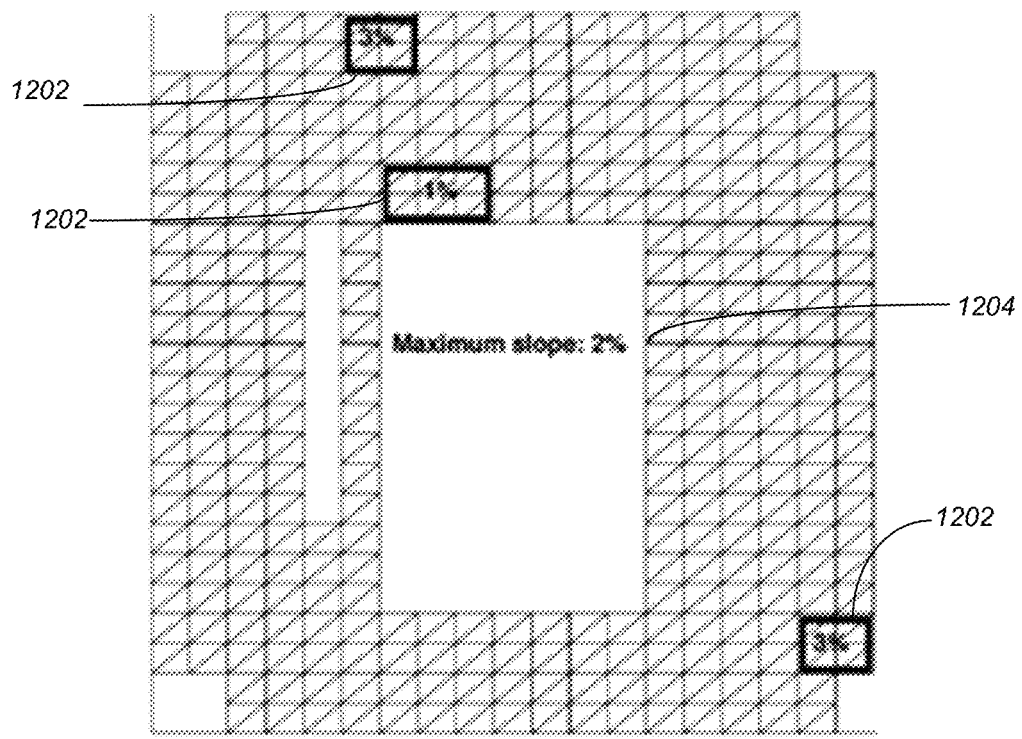
FIG. 12 illustrates zones with maximum slopes that override the global maximum slope setting in accordance with one or more embodiments of the invention.
Figure 13:
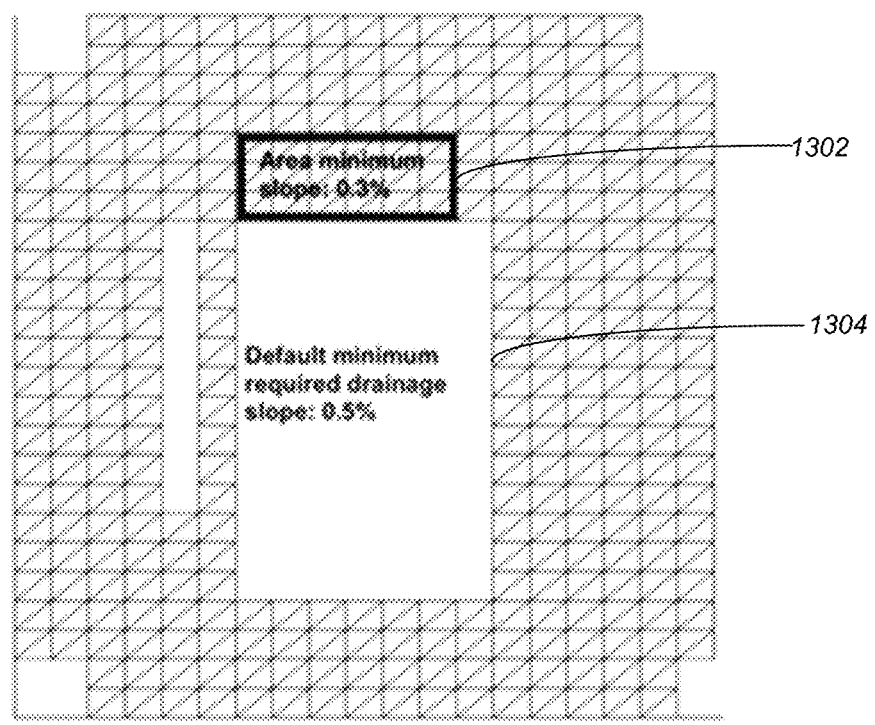
FIG. 13 illustrates a minimum slope property for a given surface zone that can override the Global minimum slope setting in accordance with one or more embodiments of the invention.

The Maximum Slope property for a given surface zone can override the Global Maximum Slope setting, or any other Maximum Slope setting that has a lower priority than the given zone. The Minimum Slope property for a given surface zone can override the Global Minimum Slope setting, or any other Minimum Slope setting that has a lower priority than the given zone. FIG. 12 illustrates zones 1202 with maximum slopes that override the global maximum slope setting 1204 in accordance with one or more embodiments of the invention. FIG. 13 illustrates a minimum slope property for a given surface zone 1302 that can override the Global minimum slope setting 1304 in accordance with one or more embodiments of the invention.

Independent Drainage

The Independent Drainage property for a given surface zone can affect how the direction for the minimum oriented slope constraint is determined. The independent drainage property may require the triangles inside the given zone to look at drain lines or low points or other drain direction features that are placed inside the given zone only. Also, the given zone may hide such drain direction features from other zones around it.

Aligned

The Aligned property for a given surface zone may require that all triangles within that given zone should align themselves.

Exclusion

The Exclusion property for a given surface zone may require that all triangles within that given zone should not be altered by the optimization, or not be included in the optimization process.

No Minimization

The No Minimization property for a given surface zone may require that all triangles within that given zone should be excluded from minimization or maximization of some objective during the optimization process.

Grading Limit Zone

The grading limit property is to restrict the optimization inside a given land area which could be defined by a property line. Embodiments of the invention may not change the surface outside the grading limit zone and can avoid unnecessarily re-triangulating and optimizing triangles and where no changes can occur anyway.

Complex Grading Elements

Triangulation for Complex Grading Elements

Generally, embodiments of the invention may triangulate the terrain surface into a constrained Delaunay triangulation mesh ([Chew 2018]). Embodiments of the invention may use the existing survey points as the mesh vertices to create the final TIN. In additional to the survey points, there are often some feature lines in the source data to represent some important terrain features, or some other utility objects such as pipeline for drainage. Embodiments of the invention may also make sure certain required segments appear in the TIN (e.g., resulting in the constrained Delaunay triangulation).

During the triangulation process, embodiments of the invention may also add some Steiner points ([Hwang 1992], [Chew 1993]) to ensure all the triangles are in the "right shape", which means as equilateral and equiangular as possible. This kind of triangle mesh is suitable to the terrain. However, the complex grading elements may need some different triangulation methods to meet their requirements.

Curb

Figure 14A:
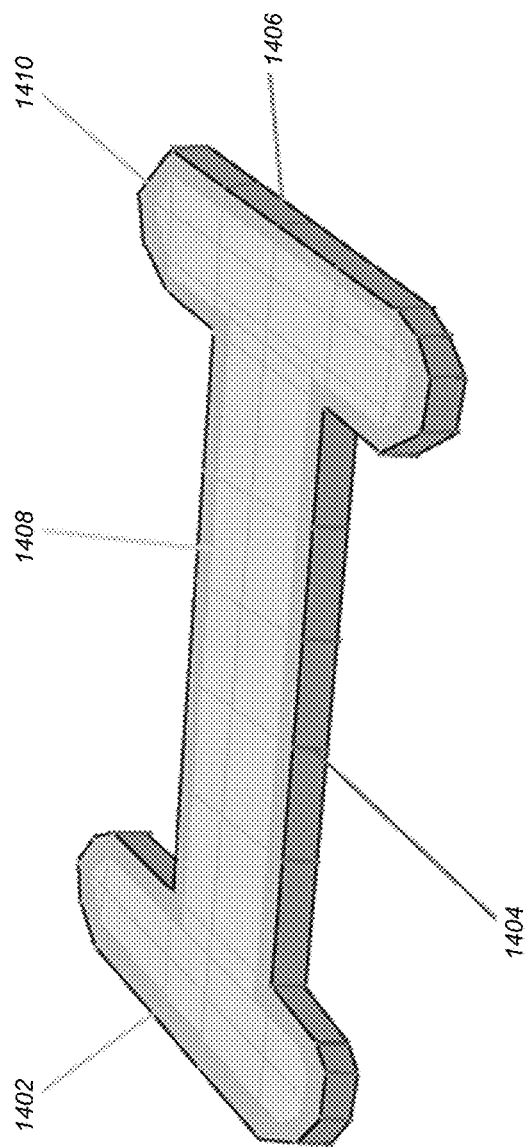
FIGS. 14A and 14B show how a typical curb looks in accordance with one or more embodiments of the invention.
Figure 14B:
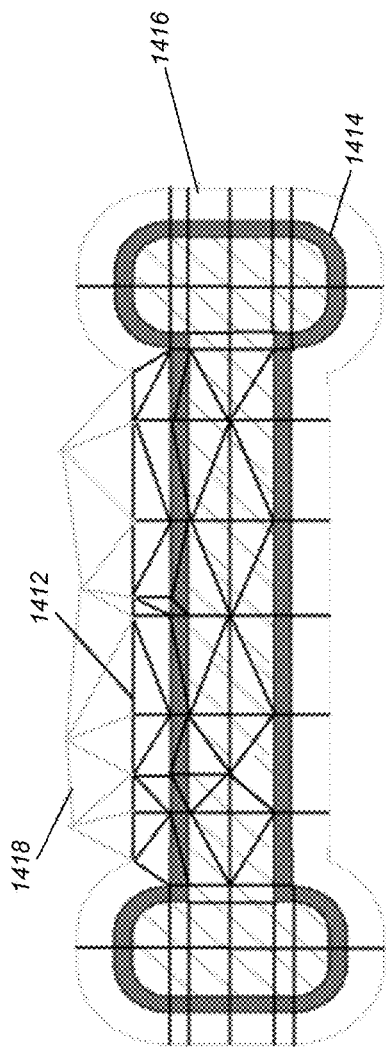

FIGS. 14A and 14B show how a typical curb looks in accordance with one or more embodiments of the invention. Break lines 1402 along the curb access allow the curb surface to bend and follow the surface underneath. The left and right side of the curb may drain in different directions. Elevation offsets 1404 will enforce the curb height. The offsets need to be placed on any vertical edge that the triangulation produces. It may be preferable that any triangle vertex on the polygon that represents the curb to have a vertical edge for an elevation offset. Any vertex without such an offset may result in a kink in the final curb.

An objective override zone 1406 (no minimization zone) may prevent the solver from trying to smooth the edge between the curb wall and the top and bottom surfaces. Also, the solver will not try to minimize earthwork on the triangles that are part of the curb wall. Without the objective override zone 1406, solving may take much longer and results may look weird (e.g., the solver may try to make compromises between elevation offsets and objectives). For the zone properties, the SMax (slope maximum) may be equal to infinity (because it is a wall) with an SMin (slope minimum) of 0.0.

A max override zone 1408 on top of the curb may allow the placement of a stricter max slope on the top of the curb to accommodate walking and wheel chairs. Drainage on a max override zone 1408 may still follow the drainage pattern of the surface underneath and the SMin may be greater than zero (0). Further, a max override zone 1410 (similar to the inner max override zone 1408) may have a different material thickness, which means the volume calculation will be affected slightly. Material thickness means how deep the excavation will be in reality.

FIG. 14B illustrates an example of curb triangulation 1412 that allows elevation offsets and bending of the curb in at least four (4) directions. The curb edge 1414 has a different depth offset than the interior of the curb or the pavement surface. Such a depth offset refers to what a bulldozer really cuts before they add gravel or other material. In this regard, the offset will be used for cut and fill volumes. In addition to the curb triangles 1412, FIG. 14B illustrates the outer polygon 1416 for the curb and exemplary parking surface triangles 1418.

Figure 14C:
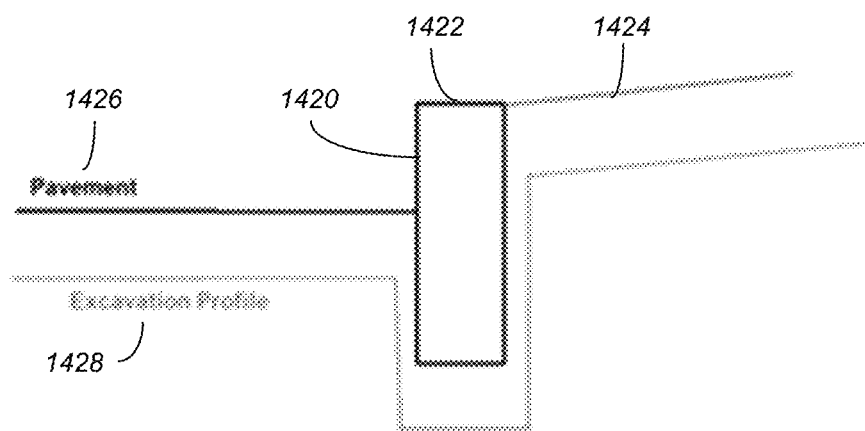
FIG. 14C shows the curb profile in accordance with one or more embodiments of the invention.

FIG. 14C shows the curb profile in accordance with one or more embodiments of the invention. Referring to FIG. 14C, the curb is a composite of three parts: curb vertical wall 1420, curb wall top 1422, and curb top 1424. The description below shows how embodiments of the invention triangulate the curb and how it sets up the constraints to shape the curb in the model.

Curb Vertical Wall 1420

Figure 14D:
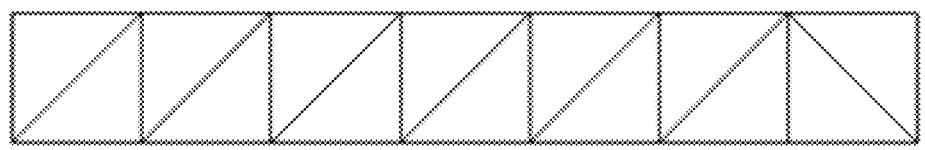
FIG. 14D illustrates a final triangulation of a vertical wall in accordance with one or more embodiments of the invention.

The curb wall top 1422 is higher than the existing ground (e.g., pavement 1426). The elevation difference is a fixed value. Thus, some elevation offset constraints need to be setup on the vertical wall 1420 to make sure the wall top 1422 is always higher than the ground 1426 by a fixed value, no matter how the terrain is changed in order to meet the optimization goal. The elevation offset constraints can be setup as FIG. 14A shows. There are several parallel edges between the wall top 1422 and wall bottom, which are the elevation offset constraints 1404. In order to make sure the elevation offset constraints 1404 work correctly, there shouldn't be any other vertex appearing on the vertical wall. Thus, the final triangulation of the vertical wall will be similar to that illustrated in FIG. 14D.

Curb Wall Top 1422

The wall top surface 1422 is always parallel to the terrain surface beneath it, so that it is always higher than the terrain by a fixed value. Apparently, the curb top 1424 may not be flat because the terrain is not flat in most cases. A max override zone may need to be created for the wall top 1422, so that all the other max slope constraints can be disregarded for the wall top 1422 to make sure it follows the terrain's shape. To simplify the case, all the survey points in the wall top region may be removed.

Curb Top 1424

A max override zone may be required for the curb top 1424, so that a stricter max slope can be applied on the curb top 1424 to accommodate walking and wheelchairs. Drainage on a max override zone will still follow the drainage pattern of the surface underneath (e.g., based on the excavation profile 1428). As for the triangulation of the curb top 1424, the existing survey points may not be required to be removed and a normal Delaunay triangulation may be sufficient.

Grading Objectives

Embodiments of the invention may allow the user to choose from a grading objective, or a combination of multiple grading objectives (e.g., multiple design options 324 of FIG. 3). The user may give different weights to the different objectives. The optimization method used may then try to minimize or maximize the objectives, depending on the user input. Three exemplary objectives that can be used by the user are described below.

Grade Change Minimization

An objective of the grading optimization may be to minimize the grade change between pairs of adjacent triangles. This objective may be applied to all or only certain pairs of triangles on the surface, depending on zones or other input by the user. A grade change minimization will result in a smooth terrain, which in turn results in nice grading contours. Accordingly, this grading optimization may be referred to as a smooth grading change option.

Minimization of Absolute Volumes

Another objective of the grading optimization may be to minimize the absolute volumes between the original surface, and the optimized surface. This objective may be applied to all or only certain pairs of triangles on the surface, depending on zones or other input by the user. Minimizing absolute volumes may result in smaller earthwork costs when grading the terrain according to the solution. Accordingly, this grading optimization may be referred to as a minimization of absolute earthwork volume option.

Balancing Cut and Fill

A further objective of the grading optimization may be to minimize the absolute value of the net volume between the original surface and the optimized surface. This objective may be applied to all or only certain pairs of triangles on the surface, depending on zones or other input by the user. Minimizing the absolute value of the net volume may result in a solution that balances cut and fill volumes (which may also reduce the earthwork costs [e.g., via transport of cut and fill earthwork]). Accordingly, this grading optimization may be referred to as a balance of cut and fill option and/or earthwork cut and fill balancing.

Mapping Design Tool Geometries to Grading Elements

A lot of time, the grading element geometry or constraint data is already represented in another format in various design documents, such as the geometry of a building pad object designed in REVIT, and/or another CAD software application could be used as an aligned surface zone for grading. To streamline the design process, embodiments of the invention may connect to different data sources and map each element to grading elements so that users don't have to recreate another representation from scratch just for optimization.

Mapping of Geometry to Grading Elements

The most important part to map is the geometry of the grading elements. For different type of grading elements, different input could be taken. The following table illustrates the mapping of each grading element geometry to an exemplary grading element in a different application.

| Grading Element | Input Type | Mapping | Example |
| --- | --- | --- | --- |
| Low Point | Point | Uses the 2D coordinates of the point | COGO point in CIVIL 3D |
| Bounded Point | Point | Uses the 2D coordinates of the point | COGO point in CIVIL 3D |
| Aligned Edge | Polyline | Uses the 2D coordinates of vertices of polyline | Polyline/2dpolyline/3dpolyline in CIVIL 3D |
| Bend Line | Polyline | Uses the 2D coordinates of vertices of polyline | Polyline/2dpolyline/3dpolyline in CIVIL 3D |
| Drain Line | Polyline | Uses the 2D coordinates of vertices of polyline | Polyline/2dpolyline/3dpolyline in CIVIL 3D |
| Elevation Offset | Line Segment | Uses the 2D coordinates of vertices of line segment | Polyline/2dpolyline/3dpolyline in CIVIL 3D |
| Zone | Polygon | Uses the 2D coordinates of vertices of polygon | Closed Polyline/2dpolyline/3dpolyline in CIVIL 3D |

To help mapping a specific design object to grading element, a pattern matching based approach can be used to do the mapping automatically instead of manual mapping on each object. In particular, many CAD drawings uses different layers to manage different types of objects where the name of the layer can be used as the target for pattern matching to automatically select the target grading element type. For instance, a closed polygon on a layer named 'BuildingPad' would be mapped to aligned surface zone automatically.

Mapping the Attributes to Grading Elements

Some attributes like "visible" and "type" could be mapped from other design data as well. Some of the possible ways of mappings are:

1. Visibility of layer at which design data resides in CIVIL3D could be mapped to Visible property of grading element;
2. Type of grading element could be mapped from pattern matching result of name of layer, a certain property of the object (such as name or property sets in CIVIL 3D);

Terrain Model

The terrain surface model could also be mapped from other design software. For instance, the terrain surface object in CIVIL 3D could be mapped to the system by just taking all the triangle geometry represented as points data (x, y, z) and 3 indices of points for each triangle. The system will then optimize each triangle.

Using Infrastructure Design Objects to Set Up Grading Elements

Grading elements could be mapped from design data through a file import that only does one-time mapping automatically by certain pattern matching rules, which are defined by a user or system built-in templates. Different data sources could be used to map to grading elements, like the non-proprietary data standard of the Land Development industry—LandXML or geospatial vector data format for geographic information system (GIS) software—shapefile.

Figure 15:
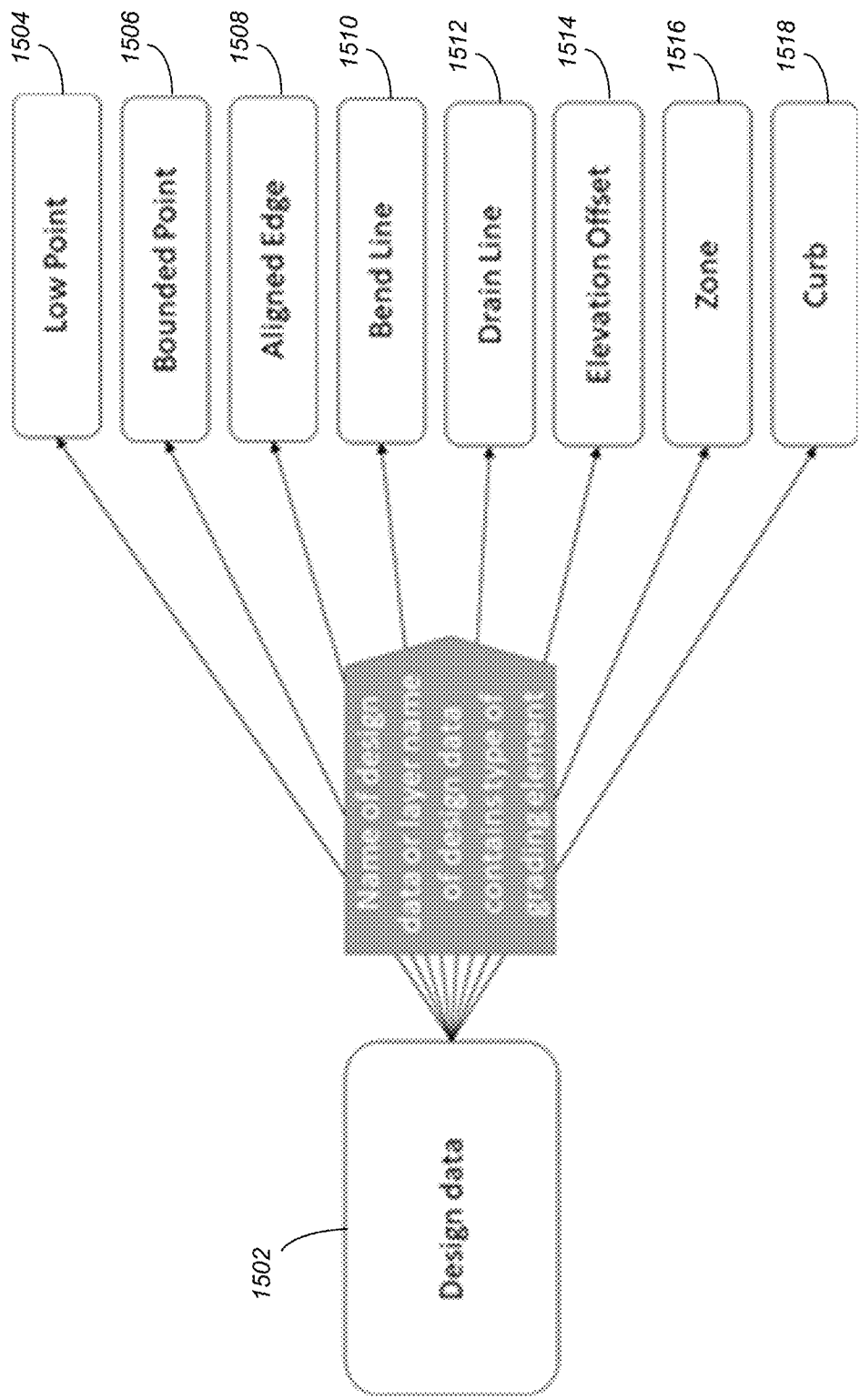
FIG. 15 illustrates a mapping from different data sources to grading elements in accordance with one or more embodiments of the invention.

The mapping from different data sources to grading elements is illustrated in FIG. 15. As illustrated, design data 1502 including the name of the design data or layer name of design data that contains the type of grading element, can be mapped to a specific grading element including a low point 1504, bounded point 1506, aligned edge 1508 (e.g., a line that captures all the triangle vertices that touch [or within a threshold distance of] the line, and aligns them in a straight line with respect to the z-axis), bend line 1510 (e.g., that relaxes triangles that touch or cross the line and sets a minimum required drainage slope to zero and max slope to infinity), drain line 1512, elevation offset 1514, zone 1516, and/or curb 1518.

The mapping could be a one-to-many mapping. For instance, a building pad design object could be mapped to a curb 1518 around the building pad, a zone 1516 to align the surface, and a bounded point 1506 to set the elevation range. The rule could be application defined or customized through some user interface (e.g., such as DYNAMO for BIM).

Using Infrastructure Design Objects in a Cloud Framework

Figure 16:
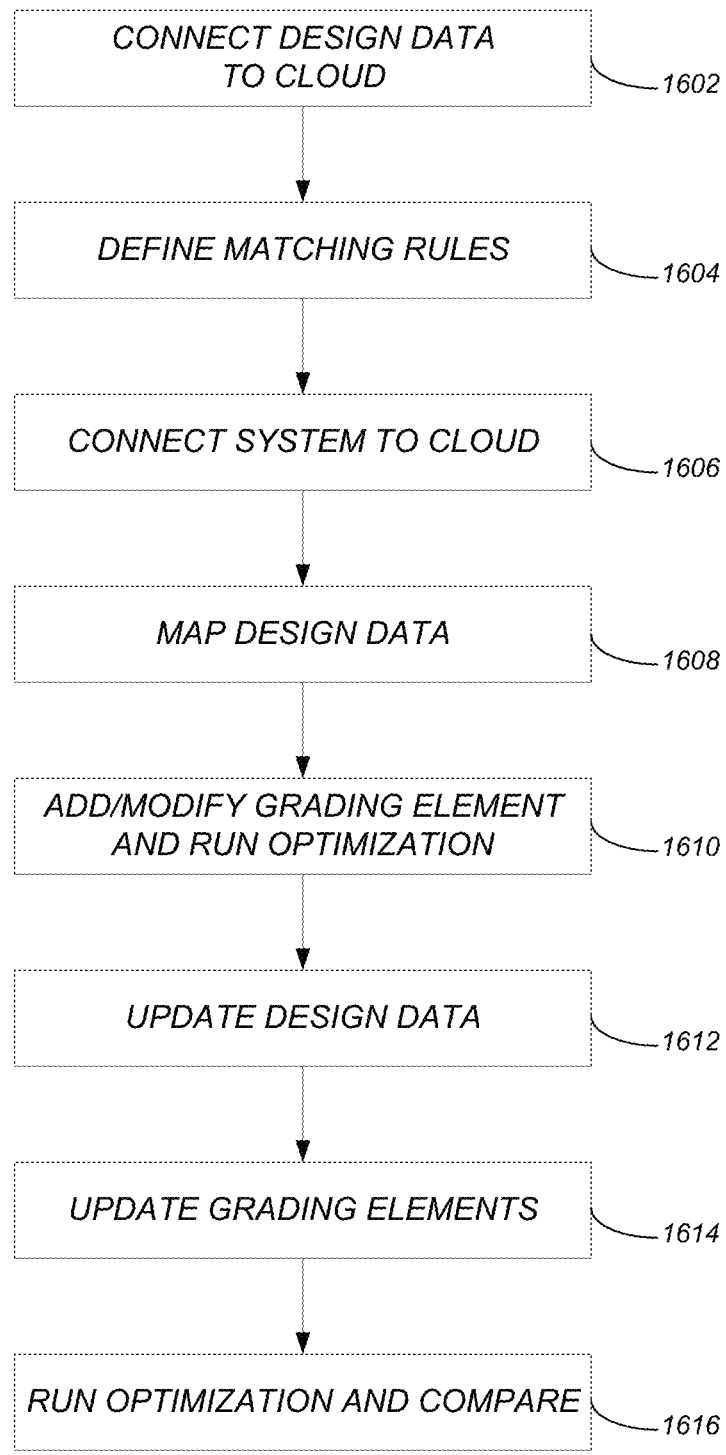
FIG. 16 illustrates the logical flow for mapping design data to grading elements and terrain objects via a cloud framework in accordance with one or more embodiments of the invention.

The mapping from design data to grading elements and terrain objects can be done through a file import that only does one-time mapping, but it also can be done through a cloud framework where the design data is live—that can be changed overtime. FIG. 16 illustrates the logical flow for mapping design data to grading elements and terrain objects via a cloud framework in accordance with one or more embodiments of the invention.

At step 1602, the user connects the design data to the cloud.

At step 1604, certain pattern matching rules are defined by the user.

At step 1606, the user connects the system to the same cloud environment.

At step 1608, the system maps the design data to grading elements and terrain objects and also maintains a connection between the design data and mapped objects.

At step 1610, the user adds/modifies the grading elements, runs the optimization and the output is shared to the cloud.

At step 1612, the user updates the design data and the change is available in the cloud.

At step 1614, the system updates the grading elements based on the mapping rules which would save the time for mapping as well as redo the changes in step 1612.

At step 1616, the user runs the optimization and compares results.

Produce Multiple Options

Embodiments of the invention may provide customers with multiple terrain results. They can be produced by the user manually, or by the system or another external system that uses the proposed method.

Based on Converging History

When the system optimizes the surface, it may run through a large quantity of iterations and may converge to an optimal solution, or a solution that may be as close as possible to what the user desires (closest approximation) (i.e., within a threshold level). A user can stop at any iteration and decide to use the current result, which may not be the optimal one, but works out for the user for another reason. The optimization process may be a recorded history that can be reviewed step by step.

Based on Combinations of Grading Objectives

The system allows users to select different grading objectives or a combination of grading objectives as described above.

Each objective may be assigned a weight from a range of numerical weights (e.g., 0-100). Combinations of grading objectives with different weights can introduce multiple optimization results. Users can evaluate results based on different combinations of weights and objectives. These combinations may be set by the user directly, or they can be generated based on some sampling methods of the weights and combinations. Other optimization methods could be used to produce the best possible combinations of weights and objectives for what the user desires.

Variation in Constraints on the Solution as a New Starting Point

The system may allow the user to select a solution as a new starting point or new starting surface for another optimization. Hence, a solution may be stored as a new existing ground surface, where new constraints can be placed, or where existing constraints may be altered. The user may also be allowed to fix areas of that new surface, for example by using Exclusion Zones. This process can be done repeatedly until the user is satisfied.

Analyze Optimization Results

Figure 17:
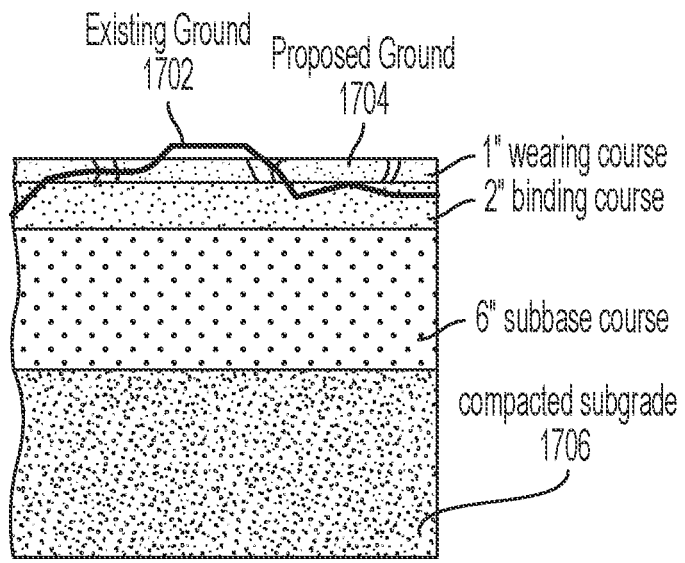
FIG. 17 shows a section view of an exemplary parking lot that includes nine (9) inches of material in accordance with one or more embodiments of the invention.

Cut and fill analysis is an important measurement of how efficient the site is graded, and how satisfied the user is evaluating the optimization result. FIG. 17 shows a section view of an exemplary parking lot that includes nine (9) inches of material (i.e., 1" of wearing course+2" of binding course+6" of subbase course) in accordance with one or more embodiments of the invention. In order to build the parking lot, existing ground/earth 1702 has to be removed from the ground first, and filled with material to reach the proposed ground 1704.

Grading optimization tool offers valid estimation about the amount of earth needed to be moved, and amount of earth needed to be filled. In the civil construction industry, a good rule of thumb for grading is to achieve the best cut and fill balance, by which the minimum amount of dirt is needed to be brought in, or tow away off the site.

There are two types of cut and fill analysis data computed by grading optimization result: finished grade and subgrade.

Cut and Fill Created Based on Finished Ground

Figure 18:
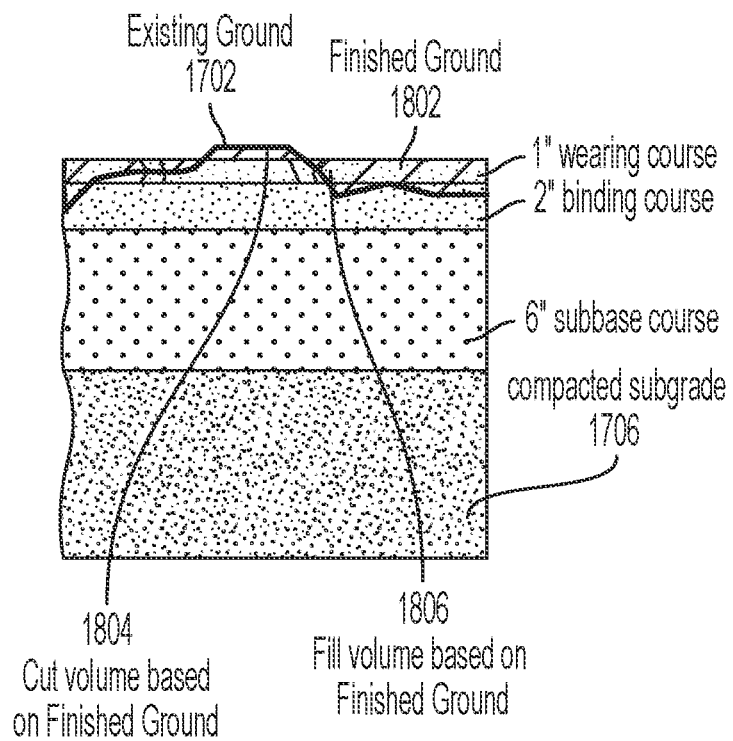
FIG. 18 illustrates how the cut and fill volume data based on finished ground can be generated in accordance with one or more embodiments of the invention.

Cut and fill data based on finish ground provides an overall view of what has been changed in comparison to existing ground 1702. This information is often used at the design stage to compare terrain before and after a grading design. FIG. 18 illustrates how the cut and fill volume data based on finished ground can be generated in accordance with one or more embodiments of the invention. As illustrated, to achieve the finished ground 1802, the area 1804 below the existing ground line 1702 and above the finished ground 1802 is the cut volume and the area 1806 above existing ground 1702 and below the finished ground 1802 is the fill volume needed.

Cut and Fill Created Based on Subgrade

Figure 19:
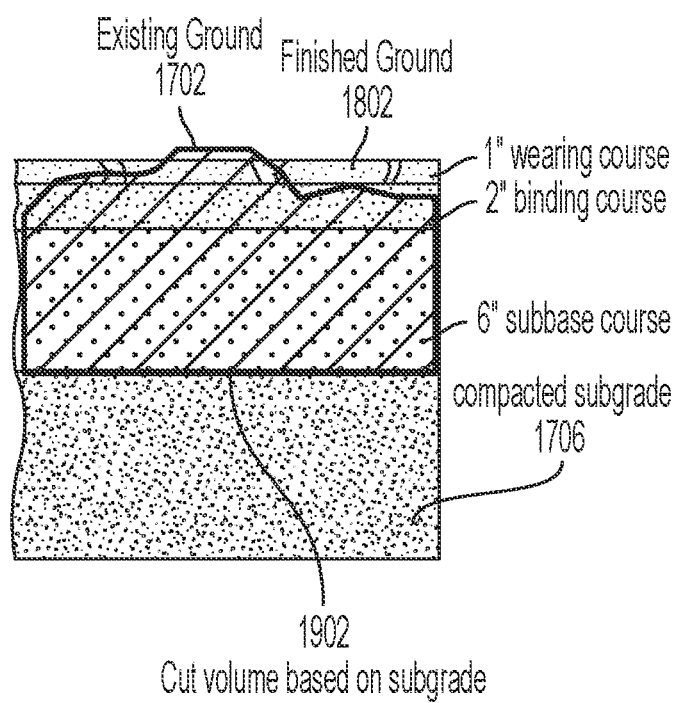
FIG. 19 illustrates the cut and fill volume based on subgrade in accordance with one or more embodiments of the invention.

Cut and Fill data based on subgrade provides an in-depth understanding of the amount of dirt that needs to be removed/fill based on depth of the grading material. Subgrade factor is a value to calculate shrink of subgrade 1706, which may result in an enlarged volume of the cut/fill volume. Cut and fill created based on subgrade 1706 is more accurate when estimating construction work. FIG. 19 illustrates the cut and fill volume based on subgrade 1706 in accordance with one or more embodiments of the invention. As illustrated, the compacted subgrade can cause an expansion/enlarged cut volume 1902 that would necessitate the use of the subgrade factor.

Use of Optimization Result

Referring again to FIG. 3, as the output of the optimization, the user will get one or multiple optimized surface results (e.g., multiple design options 324) from the system. Users can choose and share back one or more optimized surface result(s)/options 324 to the design tool(s) 330 for different purposes. In addition, in embodiments of the invention, during the optimization, the solver 304 may display (in the canvas) the shape terrain as it is being changed (based on the constraints/settings). In other words, the user can see a live visualization/animation of the terrain actively changing during the optimization process. Further, a progress bar may show the progress with respect to the number of iterations and/or may stop if the solver 304 converges to the tolerance before the maximum number of iterations is reached. The user can further select a color scheme to better visualize the slope violations (e.g., dark red if a triangle violates a maximum slope constraint and light red for a minimum drainage slope violation). Additional embodiments may also provide the ability to display various animations/simulations using/based on the optimized terrain. For example, a rain animation/simulation may show rain drops flowing on the terrain (e.g., faster on steeper terrain and slower on flatter terrain).

Use Result as a Conceptual Inspiration

Users can treat a result as a preliminary design tool to shape the way terrain can be designed, and identify places that may need additional work. The amount of time embodiments of the invention save, in comparison to manual grading, enables users to explore more options 324 for site design. Optimization results provide the user with a quick reality check of what a site could be like, while also helping less experienced civil designers avoid grading mistakes.

Continuous Work on the Result for Detail Grading and Documentation

Users can continue working on the optimized grading result in a different tool 330, adding more data to modify fine grading. Labels and annotations can be added continuously for documentation and sharing purpose.

Hardware Environment

Figure 20:
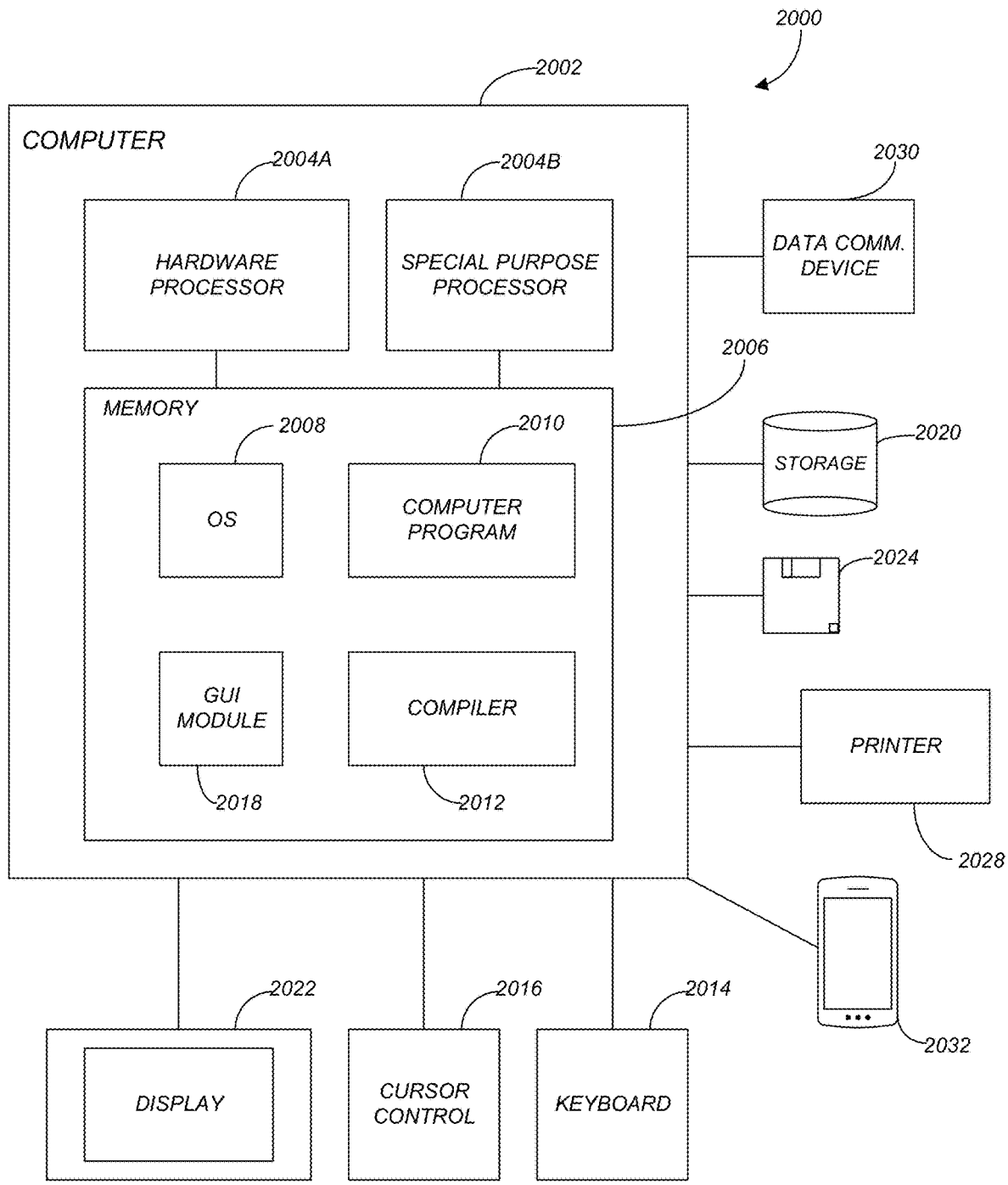
FIG. 20 is an exemplary hardware and software environment used to implement one or more embodiments of the invention.

FIG. 20 is an exemplary hardware and software environment 2000 (referred to as a computer-implemented system and/or computer-implemented method) used to implement one or more embodiments of the invention. The hardware and software environment includes a computer 2002 and may include peripherals. Computer 2002 may be a user/client computer, server computer, or may be a database computer. The computer 2002 comprises a hardware processor 2004A and/or a special purpose hardware processor 2004B (hereinafter alternatively collectively referred to as processor 2004) and a memory 2006, such as random access memory (RAM). The computer 2002 may be coupled to, and/or integrated with, other devices, including input/output (I/O) devices such as a keyboard 2014, a cursor control device 2016 (e.g., a mouse, a pointing device, pen and tablet, touch screen, multi-touch device, etc.) and a printer 2028. In one or more embodiments, computer 2002 may be coupled to, or may comprise, a portable or media viewing/listening device 2032 (e.g., an MP3 player, IPOD, NOOK, portable digital video player, cellular device, personal digital assistant, etc.). In yet another embodiment, the computer 2002 may comprise a multi-touch device, mobile phone, gaming system, internet enabled television, television set top box, or other internet enabled device executing on various platforms and operating systems.

In one embodiment, the computer 2002 operates by the hardware processor 2004A performing instructions defined by the computer program 2010 (e.g., a computer-aided design [CAD] application) under control of an operating system 2008. The computer program 2010 and/or the operating system 2008 may be stored in the memory 2006 and may interface with the user and/or other devices to accept input and commands and, based on such input and commands and the instructions defined by the computer program 2010 and operating system 2008, to provide output and results.

Output/results may be presented on the display 2022 or provided to another device for presentation or further processing or action. In one embodiment, the display 2022 comprises a liquid crystal display (LCD) having a plurality of separately addressable liquid crystals. Alternatively, the display 2022 may comprise a light emitting diode (LED) display having clusters of red, green and blue diodes driven together to form full-color pixels. Each liquid crystal or pixel of the display 2022 changes to an opaque or translucent state to form a part of the image on the display in response to the data or information generated by the processor 2004 from the application of the instructions of the computer program 2010 and/or operating system 2008 to the input and commands. The image may be provided through a graphical user interface (GUI) module 2018. Although the GUI module 2018 is depicted as a separate module, the instructions performing the GUI functions can be resident or distributed in the operating system 2008, the computer program 2010, or implemented with special purpose memory and processors.

In one or more embodiments, the display 2022 is integrated with/into the computer 2002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 2002 according to the computer program 2010 instructions may be implemented in a special purpose processor 2004B. In this embodiment, some or all of the computer program 2010 instructions may be implemented via firmware instructions stored in a read only memory (ROM), a programmable read only memory (PROM) or flash memory within the special purpose processor 2004B or in memory 2006. The special purpose processor 2004B may also be hardwired through circuit design to perform some or all of the operations to implement the present invention. Further, the special purpose processor 2004B may be a hybrid processor, which includes dedicated circuitry for performing a subset of functions, and other circuits for performing more general functions such as responding to computer program 2010 instructions. In one embodiment, the special purpose processor 2004B is an application specific integrated circuit (ASIC).

The computer 2002 may also implement a compiler 2012 that allows an application or computer program 2010 written in a programming language such as C, C++, Assembly, SQL, PYTHON, PROLOG, MATLAB, RUBY, RAILS, HASKELL, or other language to be translated into processor 2004 readable code. Alternatively, the compiler 2012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 2010 accesses and manipulates data accepted from I/O devices and stored in the memory 2006 of the computer 2002 using the relationships and logic that were generated using the compiler 2012.

The computer 2002 also optionally comprises an external communication device such as a modem, satellite link, Ethernet card, or other device for accepting input from, and providing output to, other computers 2002.

In one embodiment, instructions implementing the operating system 2008, the computer program 2010, and the compiler 2012 are tangibly embodied in a non-transitory computer-readable medium, e.g., data storage device 2020, which could include one or more fixed or removable data storage devices, such as a zip drive, floppy disc drive 2024, hard drive, CD-ROM drive, tape drive, etc. Further, the operating system 2008 and the computer program 2010 are comprised of computer program 2010 instructions which, when accessed, read and executed by the computer 2002, cause the computer 2002 to perform the steps necessary to implement and/or use the present invention or to load the program of instructions into a memory 2006, thus creating a special purpose data structure causing the computer 2002 to operate as a specially programmed computer executing the method steps described herein. Computer program 2010 and/or operating instructions may also be tangibly embodied in memory 2006 and/or data communications devices 2030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 2002.

Figure 21:
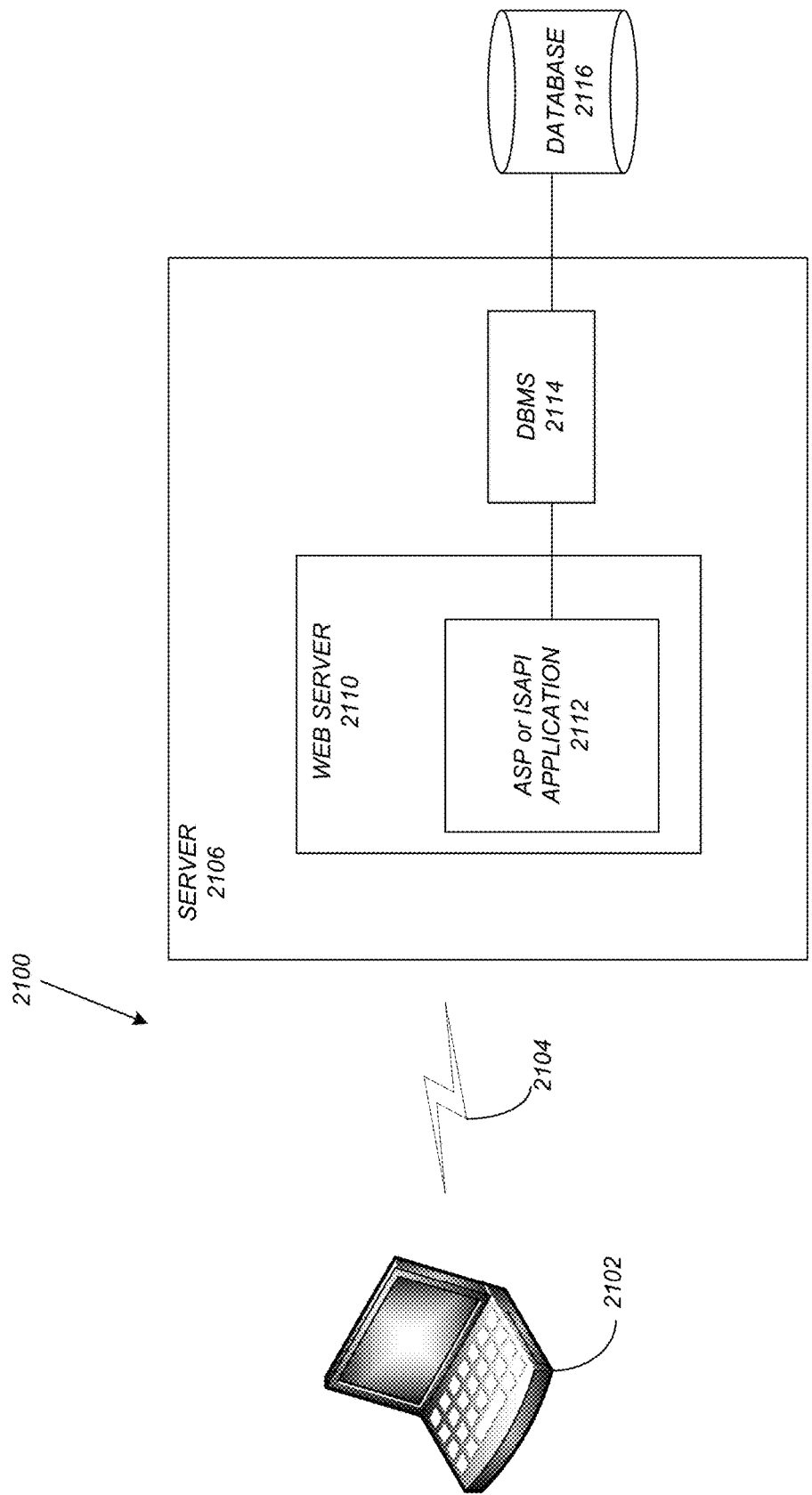
FIG. 21 schematically illustrates a typical distributed/cloud-based computer system in accordance with one or more embodiments of the invention.

FIG. 21 schematically illustrates a typical distributed/cloud-based computer system 2100 using a network 2104 to connect client computers 2102 to server computers 2106. A typical combination of resources may include a network 2104 comprising the Internet, LANs (local area networks), WANs (wide area networks), SNA (systems network architecture) networks, or the like, clients 2102 that are personal computers or workstations (as set forth in FIG. 20), and servers 2106 that are personal computers, workstations, minicomputers, or mainframes (as set forth in FIG. 20). However, it may be noted that different networks such as a cellular network (e.g., GSM [global system for mobile communications] or otherwise), a satellite based network, or any other type of network may be used to connect clients 2102 and servers 2106 in accordance with embodiments of the invention.

A network 2104 such as the Internet connects clients 2102 to server computers 2106. Network 2104 may utilize ethernet, coaxial cable, wireless communications, radio frequency (RF), etc. to connect and provide the communication between clients 2102 and servers 2106. Further, in a cloud-based computing system, resources (e.g., storage, processors, applications, memory, infrastructure, etc.) in clients 2102 and server computers 2106 may be shared by clients 2102, server computers 2106, and users across one or more networks. Resources may be shared by multiple users and can be dynamically reallocated per demand. In this regard, cloud computing may be referred to as a model for enabling access to a shared pool of configurable computing resources.

Clients 2102 may execute a client application or web browser and communicate with server computers 2106 executing web servers 2110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 2102 may be downloaded from server computer 2106 to client computers 2102 and installed as a plug-in or ACTIVEX control of a web browser. Accordingly, clients 2102 may utilize ACTIVEX components/component object model (COM) or distributed COM (DCOM) components to provide a user interface on a display of client 2102. The web server 2110 is typically a program such as MICROSOFT'S INTERNET INFORMATION SERVER.

Web server 2110 may host an Active Server Page (ASP) or Internet Server Application Programming Interface (ISAPI) application 2112, which may be executing scripts. The scripts invoke objects that execute business logic (referred to as business objects). The business objects then manipulate data in database 2116 through a database management system (DBMS) 2114. Alternatively, database 2116 may be part of, or connected directly to, client 2102 instead of communicating/obtaining the information from database 2116 across network 2104. When a developer encapsulates the business functionality into objects, the system may be referred to as a component object model (COM) system. Accordingly, the scripts executing on web server 2110 (and/or application 2112) invoke COM objects that implement the business logic. Further, server 2106 may utilize MICROSOFT'S TRANSACTION SERVER (MTS) to access required data stored in database 2116 via an interface such as ADO (Active Data Objects), OLE DB (Object Linking and Embedding DataBase), or ODBC (Open DataBase Connectivity).

Generally, these components 2100-2116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 2102 and 2106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 2102 and 2106. Embodiments of the invention are implemented as a software/CAD application on a client 2102 or server computer 2106. Further, as described above, the client 2102 or server computer 2106 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Bauschke 1996] BAUSCHKE, H. H., AND BORWEIN, J. M. On projection algorithms for solving convex feasibility problems. *SIAM Rev.* 38, 3 (1996), 367-426.

[Chew 1993] Chew, P. L. (1993). Guaranteed quality mesh generation for curved surfaces. *Proceedings of the Ninth Annual Symposium on Computational Geometry*, (pp. 274-280).

[Chew 2018] Chew, P. L. (2018). Constrained Delaunay Triangulations. *Proceedings of the Third Annual Symposium on Computational Geometry*.

[Hwang 1992] Hwang, F. K., Richards, D. S., & Winter, P. (1992). *The Steiner Tree Problem, Annals of Discrete Mathematics*, 53. Amsterdam: Elsevier.

What is claimed is:

1. A computer-implemented method for designing a terrain surface, comprising:
   (a) obtaining, in a computer, a triangular surface mesh in three-dimensions representative of an existing surface, wherein the triangular surface mesh comprises two or more triangles that are connected by vertices and edges;

(b) specifying one or more constraints to control the triangular surface mesh, wherein:
(1) one or more of the constraints comprise a minimum or a maximum grading slope in a direction;
(2) the direction is based on a location of a closest drain element, of one or more drain elements, to each of the two or more triangles;
(c) automatically determining drainage for the triangular surface mesh based on the constraints; and
(d) optimizing the triangular surface mesh based on the drainage and one or more design options, wherein the optimizing modifies the triangular surface mesh to define drainage flow for the drainage;
wherein specifying the one or more constraints comprises:
determining a shortest distance between each of the two or more triangles and each of one or more drain elements;
selecting the drain element that has a smallest of the shortest distances; and
determining the direction for each of the two or more triangles based on a line that represents the smallest shortest distance, wherein the direction is the minimum oriented slope constraint for each of the two or more triangles.

2. The computer-implemented method of claim 1, wherein the specifying one or more constraints to control the triangular surface mesh comprises:
accepting input defining one or more grading elements, wherein:
each of the one or more grading elements comprises an element for laying out a design to be graded; and
accepting the input comprises configuring properties for each of the one or more grading elements.

3. The computer-implemented method of claim 2, wherein:
the one or more grading elements are defined in a different data source in a different format; and
the accepting input comprises:
connecting to the different data source; and
mapping the one or more grading elements defined in the different data source in the different format to one or more grading elements in a native format of a current application.

4. The computer-implemented method of claim 1, wherein the specifying one or more constraints to control the triangular surface mesh comprises:
autonomously extracting the one or more constraints from a design model.

5. The computer-implemented method of claim 4, further comprising:
accepting user input modifying the one or more constraints.

6. The computer-implemented method of claim 1, wherein:
the determining drainage comprises accepting user input comprising one or more drain lines and one or more low points; and
the optimizing comprises autonomously modifying the triangular surface mesh such that the drainage flows alongside the one or more drain lines into the one or more low points.

7. The computer-implemented method of claim 1, wherein the optimizing comprises:
providing multiple design options simultaneously; and
selecting one of the multiple design options.

8. The computer-implemented method of claim 7, wherein the multiple design options comprise:
a smooth grading change option; and
a balance of cut and fill option.

9. The computer-implemented method of claim 1, wherein:
a design is based on the triangular surface mesh;
the optimizing is encapsulated into an optimization solver application;
the optimization solver application is integrated into a different application such that the optimization solver operates transparently like it is a function of the different application;
the design output from the optimization solver is further edited in the different application.

10. The computer-implemented method of claim 1, wherein the drain element comprises a drain line or a low point.

11. A computer-implemented system for designing a terrain surface, comprising:
(a) a computer having a memory;
(b) a processor executing on the computer;
(c) the memory storing a set of instructions, wherein the set of instructions, when executed by the processor cause the processor to perform operations comprising:
(i) obtaining, in the computer, a triangular surface mesh in three-dimensions representative of an existing surface, wherein the triangular surface mesh comprises two or more triangles that are connected by vertices and edges;
(ii) specifying one or more constraints to control the triangular surface mesh, wherein:
(1) one or more of the constraints comprise a minimum or a maximum grading slope in a direction;
(2) the direction is based on a location of a closest drain element, of one or more drain elements, to each of the two or more triangles;
(iii) automatically determining drainage for the triangular surface mesh based on the constraints; and
(iv) optimizing the triangular surface mesh based on the drainage and one or more design options, wherein the optimizing modifies the triangular surface mesh to define drainage flow for the drainage;
wherein operations specifying the one or more constraints comprises:
determining a shortest distance between each of the two or more triangles and each of one or more drain elements;
selecting the drain element that has a smallest of the shortest distances; and
determining the direction for each of the two or more triangles based on a line that represents the smallest shortest distance, wherein the direction is the minimum oriented slope constraint for each of the two or more triangles.

12. The computer-implemented system of claim 11, wherein the specifying one or more constraints to control the triangular surface mesh comprises:
accepting input defining one or more grading elements, wherein:
each of the one or more grading elements comprises an element for laying out a design to be graded; and
accepting the input comprises configuring properties for each of the one or more grading elements.

13. The computer-implemented system of claim 12, wherein:
the one or more grading elements are defined in a different data source in a different format; and
the accepting input comprises:
connecting to the different data source; and
mapping the one or more grading elements defined in the different data source in the different format to one or more grading elements in a native format of a current application.

14. The computer-implemented system of claim 11, wherein the specifying one or more constraints to control the triangular surface mesh comprises:
autonomously extracting the one or more constraints from a design model.

15. The computer-implemented system of claim 14, wherein the operations further comprise:
accepting user input modifying the one or more constraints.

16. The computer-implemented system of claim 11, wherein:
the determining drainage comprises accepting user input comprising one or more drain lines and one or more low points; and
the optimizing comprises autonomously modifying the triangular surface mesh such that the drainage flows alongside the one or more drain lines into the one or more low points.

17. The computer-implemented system of claim 11, wherein the optimizing comprises:
providing multiple design options simultaneously; and
selecting one of the multiple design options.

18. The computer-implemented system of claim 17, wherein the multiple design options comprise:
a smooth grading change option; and
a balance of cut and fill option.

19. The computer-implemented system of claim 11, wherein:
a design is based on the triangular surface mesh;
the optimizing is encapsulated into an optimization solver application;
the optimization solver application is integrated into a different application such that the optimization solver operates transparently like it is a function of the different application;
the design output from the optimization solver is further edited in the different application.

20. The computer-implemented system of claim 11, wherein the drain element comprises a drain line or a low point.

* * * * *